United States Patent [19] [11] 4,095,102
Tixier [45] June 13, 1978

[54] HYDROCARBON DETECTION UTILIZING NEUTRON BOREHOLE MEASUREMENTS
[75] Inventor: Maurice P. Tixier, Houston, Tex.
[73] Assignee: Schlumberger Technology Corporation, New York, N.Y.
[21] Appl. No.: 785,806
[22] Filed: Apr. 8, 1977

Related U.S. Application Data
[63] Continuation of Ser. No. 728,330, Sep. 30, 1976, abandoned, which is a continuation of Ser. No. 579,536, May 21, 1975, abandoned.

[51] Int. Cl.² ............................................. G01V 5/00
[52] U.S. Cl. .................................... 250/265; 250/269
[58] Field of Search ............... 250/262, 264, 265, 266, 250/269, 270

[56] References Cited
U.S. PATENT DOCUMENTS

| 3,435,217 | 3/1969 | Givens | 250/269 |
| 3,638,484 | 2/1972 | Tixier | 250/262 |
| 3,829,687 | 8/1974 | Caldwell | 250/262 |

Primary Examiner—Davis L. Willis
Attorney, Agent, or Firm—Edward M. Roney; Kenneth Olsen; Bruce N. Carpenter

[57] ABSTRACT

Illustrative embodiments of the present invention include methods and apparatus for producing indications of the presence of hydrocarbons in subsurface earth formations. In one embodiment, two different pore volume indications are derived and comparably displayed. The first is primarily dependent upon the hydrogen content of the fluid in the pore space of the formation and may be derived from count rate ratios obtained between two epithermal neutron responsive detectors differently spaced from a neutron source. If thermal neutron or neutron captured gamma ray responsive detectors are used, compensation is provided for thermal neutron absorption effects. The second pore volume indication is produced directly from a measurement of the thermal neutron absorption characteristic of the formation and a value for the water component of the formation.

26 Claims, 13 Drawing Figures

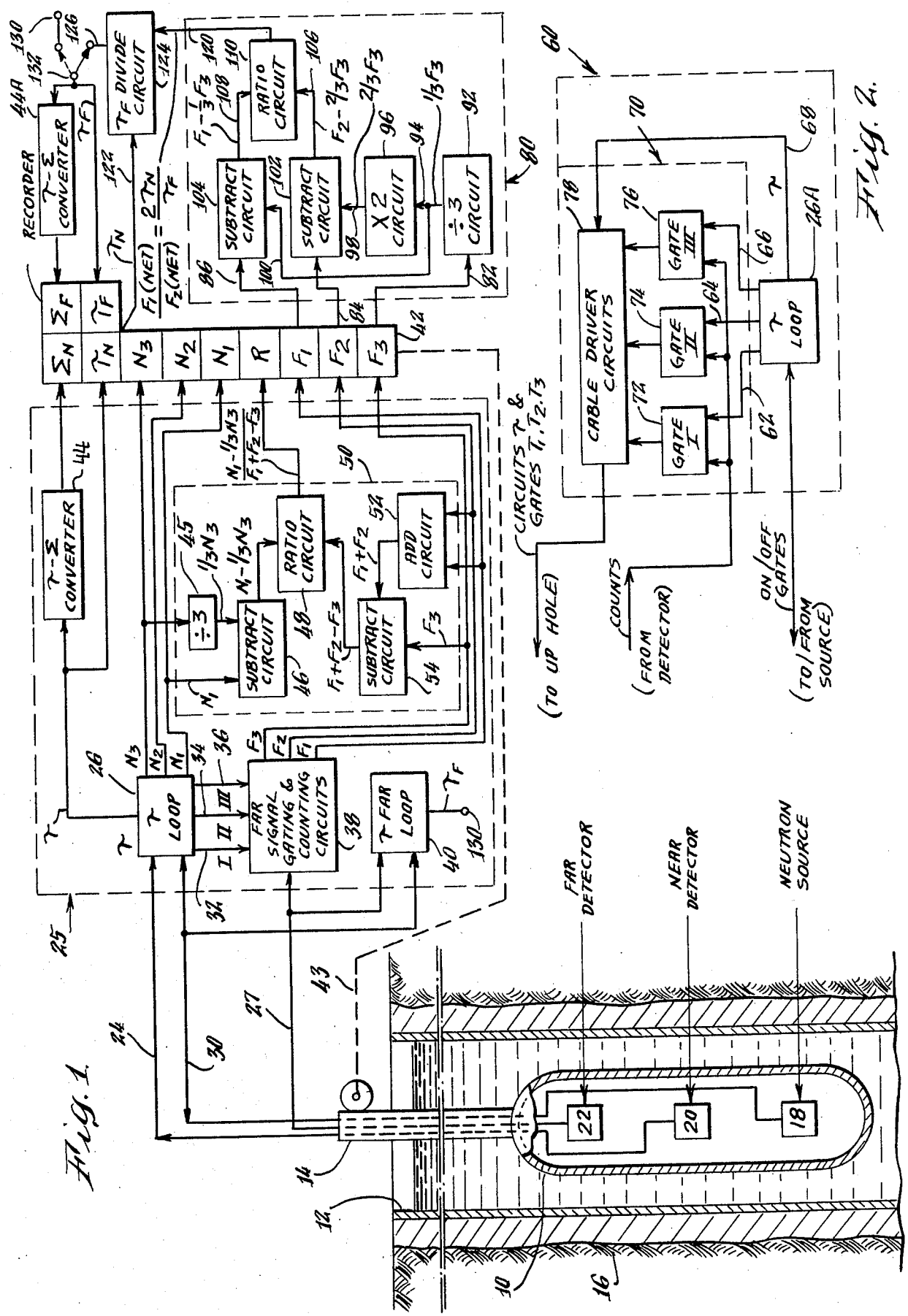

HYDROCARBON DETECTION UTILIZING NEUTRON BOREHOLE MEASUREMENTS

This is a continuation of application Ser. No. 728,330, filed Sept. 30, 1976 and now abandoned which is a continuation of Ser. No. 579,536, filed 5/21/75 now abandoned.

The formation water component may be determined by adjusting an estimated value until the two pore volume indications are in substantial agreement in a porous formation where hydrocarbons are indicated to be absent. Alternatively, a separate adjustable circuit is provided to derive this value from the absorption characteristic measurement and the first pore volume indication.

Hydrocarbons are reliably detected by differences in the pore volume indications, even when clay fractions are higher and when formation water salinities are lower than normally required for prior art absorption measurement application. Compensations for hydrocarbon type and clay effects may also be made. The nature of the hydrocarbon may also be indicated, thus distinguishing oil from gas and which oils are likely to be too viscous to produce. Indications for hydrocarbon producibility and water free production are also provided for use with the compensated second pore volume indicator.

This invention relates in general to neutron logging of subsurface earth formations and, in particular, to novel apparatus and procedures for providing indications of the presence of hydrocarbons in the pores of these formations.

The introduction of pulsed neutron sources has made possible the measurement of the thermal neutron decay time $\tau$ or its equivalent, the thermal neutron absorption cross-section $\Sigma$ (where $\Sigma = 4.55/\tau$). This measurement is primarily responsive to the amount of thermal neutron absorbers in the formation which is generally controlled by the volume of formation water and its chlorine concentration. Thus, when the volume of the water can be estimated from an independent measurement such as formation porosity, the chlorine concentration, or salinity, of the formation water may be obtained. The formation water salinity may be used with porosity or resistivity measurements for determining the water saturation of relatively shale or clay free formations.

Methods and apparatus for making $\tau$ or $\Sigma$ measurements are described in U.S. Pat. No. 3,566,116 issued Feb. 23, 1971, to W. Nelligan. Further descriptions may be found, for example, in the following U.S. Pat. No.:

3,509,342 issued Apr. 29, 1970 to J. T. Dewan;
3,609,366 issued Sept. 28, 1971 and
3,621,255 issued Nov. 16, 1971 to R. Schwartz; and
3,662,179 issued May 9, 1972 to A. Frentrop, et al.

In brief, a pulsed neutron source in the borehole supplies a burst of high energy neutrons into the formation at one point. These neutrons scatter through the formation, both through geometrical spreading and by diffusion through collisions with other nuclei, primarily hydrogen. These collisions moderate the velocity or slow down the neutrons. The population of the slower neutrons, either of epithermal or thermal energy levels, may be detected at detectors located along the borehole spaced from the source. Since hydrogen is a principal moderator in this process, the decrease in neutron population with distance from the source is primarily responsive to the volume of pore spaced or porosity available to hold hydrogen-containing liquids such as water or oil. The hydrogen-dependent neutron population decrease with distance may be measured between two differently spaced epithermal neutron detectors, for example.

As the neutrons are slowed down, the probability of capture or absorption of the neutrons, primarily controlled by the amount of chlorine present, increases substantially until at thermal energy levels, the absorption phenomena becomes the principal factor controlling the neutron population. To measure neutron populations at this energy level, thermal neutron or neutron-capture gamma ray detectors are used. Further, when pulsed sources are used, the detector time for these detectors may be delayed for a period of time after termination of the neutron burst to provide a compensation for borehole effects, since the thermal neutrons within a liquid filled borehole environment are usually absorbed substantially faster than in the formation.

Application of the $\tau$ and $\Sigma$ measurements and some additional details on the measurement techniques are further described in three recent publications:

"The Thermal Neutron Decay Time Log", by J. S. Wahl, et al, published in Dec. 1970, *Soc. of Petr. Engrs. Journal;* "Quantitative Interpretation of Thermal Neutron Decay Time Logs" (in two parts) by C. Clavier, et al, published in June 1971 in the *Journal of Pet. Tech.;* and "Thermal Neutron Decay Time Logging Using Dual Detection", by J. T. Dewan, et al, presented at the May 6–9, 1973 SPWLA 14th Annual Logging Symposium.

In general, the above papers teach the use of the $\tau$ or $\Sigma$ measurements as a formation water salinity measurement from which water saturation may be estimated if separate porosity and formation water salinity values are provided. In general, these methods utilize the equation described on page 377 of the above Wahl, et al reference:

$$\Sigma_{log} = (1-\phi)\Sigma_{ma} + \phi S_w \Sigma_w + \phi(1-S_w)\Sigma_h \quad \text{EQ.} \tag{1};$$

where the respective thermal neutron cross sections are $\Sigma_{ma}$ for the formation matrix, $\Sigma_w$ for the water, and $\Sigma_h$ for the hydrocarbon components.

The resolution of the above equation is dependent upon the accuracy and range of the required porosity $\phi$ value and the contrast between $\Sigma_{ma}$, $\Sigma_n$ and $\Sigma_w$ (salinity). Suggested application of some tools is restricted to porosity values in excess of about 15% and in some cases 20% or more and water salinity greater than about 50,000 ppm. Further, the formation must be reasonably shale-free and the lithology ($\Sigma_{ma}$) and hydrocarbon type ($\Sigma_h$) both known.

The required porosity value is usually obtained from conventional open hole porosity tools or if none are available, from a cased hole neutron log. Thus, with $\Sigma_{log}$ as input and everything else known, the above equation may be solved for $S_w$:

$$S_w = \frac{(\Sigma_{log} - \Sigma_{ma}) - \phi(\Sigma_n - \Sigma_{ma})}{\phi(\Sigma_w - \Sigma_n)} \quad \text{EQ. (2).}$$

This solution may be performed either by the use of charts or computer programs. In the latter case, the $S_w$ value is usually presented with the gamma ray as continuous curves versus borehole depth. The $S_w$ curve may be scaled from 0 to 100% of pore volume or, when multiplied by $\phi$ to give $\phi S_w$, as a percent of bulk volume curve.

When either or both $\Sigma_{ma}$ or $\Sigma_w$ is unknown, crossplots of $\Sigma_{log}$ versus some other logging measurement, such as resistivity or porosity, are usually constructed in the hope of finding a trend line, which when properly projected, provides $\Sigma_{ma}$ at a point corresponding to infinite resistivity or zero porosity and $\Sigma_w$ at a point corresponding to resistivity = $R_w$ or 100% porosity. Besides a good deal of manual effort required in selecting and merging the corresponding data from the various logs, a skilled analyst is required to construct and interpret such plots. For example, the presence of hydrocarbons may be indicated by points plotting at certain positions on such plots. The depths of these points must then be retrieved to find those formations indicated to be hydrocarbon-bearing. It would be advantageous to have hydrocarbon indications automatically provided as a direct function of borehole depth.

It is therefore an object of the present invention to provide a technique of automatically indicating the presence of hydrocarbons in subsurface earth formations traversed by a borehole.

Once the $\Sigma$ values corresponding to the matrix and fluid components have been determined by a skilled analyst, continuous curves may be automatically provided, indicating hydrocarbon saturation (1-$S_w$) or the bulk volume of hydrocarbons ($\phi$-$\phi S_w$) based upon these values and a porosity value obtained from another log such as sonic, density or neutron measurements. This requires recording of both the $\Sigma_{log}$ and porosity log values versus depth, and when acquired on separate borehole passes, as usually is the case, further requires careful merging of the data to assure depth correspondence. Each of these processes requires additional expense and delays.

It is therefore an additional object of the present invention to provide a technique for automatically indicating the presence of hydrocarbons in subsurface earth formations from measurements which may be acquired in a single traverse through a borehole.

Boreholes which have been drilled and cased and in some instances, produced for some time, often have not been properly evaluated to consider new economic situations caused by increasing hydrocarbon prices. Since, in most instances, the borehole has already been cased, conventional open hole logging techniques can no longer be employed. It thus becomes necessary to evaluate potential hydrocarbon production with measurements that can be made only through this borehole casing.

It is therefore a further object of the present invention to provide a technique for automatically indicating the presence of hydrocarbons in subsurface earth formations traversed by a cased borehole.

As previously discussed in regard to conventional thermal decay time measurement application, the dependence upon accurate $\Sigma$ measurements for the bulk formation and known $\Sigma$ values for the components of the formation as well as an independently determined porosity value combine to restrict application of thermal neutron absorption measurements to formations having relatively high porosity, high salinity and low shale content. Such formations generally correspond to the better hydrocarbon reservoirs which have been already chosen for commercial exploitation. The more marginal reservoirs which have been economically unimportant and therefore ignored in the past usually have lower porosities and are frequently accompanied by shaliness and in some cases, relatively fresh water (low salinity). The evaluation of such formations requires more accuracy than can usually be provided by prior art techniques under these less favorable circumstances. There is a need for an evaluation technique which retains its accuracy despite such unfavorable characteristics associated with less porous and more shaly reservoirs.

It is therefore a still further object of the present invention to provide a technique for automatically indicating the presence of hydrocarbons in subsurface earth formations traversed by a borehole which provides more accurate indications of the presence of hydrocarbons, particularly in formations having less favorable conditions.

In many cases, theoretical or laboratory measurements made under ideal conditions are employed to accurately determine the characteristics of the formation matrix and fluid components for use with borehole measurements which may be subject to unknown errors and effects substantially different from those encountered in theory or in the laboratory. Therefore, the borehole measurements may include large discrepancies between the theoretical or ideal response and the actual measured response. Combining measurements made under non-ideal borehole conditions with theoretical or laboratory measured values often introduces still further errors corresponding to the differences in instrument and measurement conditions. It would often be better to determine the values for formation components with the same instruments and under similar borehole measurement conditions as the measurements with which these values will be employed, since each will now include any common errors and thereby compensate.

It is therefore yet another object of the present invention to provide methods and apparatus for determining the values for formation components from the same borehole measurements which will be combined with these values to evaluate the formations, thereby compensating for errors common to both the borehole and the instruments, and thus provide a more accurate hydrocarbon indication.

In accordance with these and other objects of the invention, machine methods and apparatus are provided for automatically indicating the presence of hydrocarbons or subsurface earth formations traversed by a borehole. A first pore volume indication is produced which is primarily dependent upon the hydrogen content of the fluid in the pore space of the formation. Also produced is a function representative of a thermal neutron absorption characteristic of this formation. This absorption function is combined with a predetermined absorption characteristic for the water component of the earth formation to produce a second pore volume indication. This second pore volume indication is uncompensated for differences between the thermal neutron absorption characteristics of the matrix and any hydrocarbons which may be present in the pore space of the formation such that the presence of hydrocarbons is indicated by differences between the first and second pore volume indications. The pore volume indications may be displayed versus depth as continuous curves presented in a comparable format.

Preferably, the first pore volume indication is derived from measurements which are compensated for, or are independent of, any substantial thermal neutron absorption effects in the formation. Such measurements may be obtained from count rates derived from two detectors which are located at different spacings from a neutron source. Preferably, these detectors respond primarily to epithermal neutrons and thereby provide absorption-independent neutron populations in the formation adjacent to the detectors.

Where it is advantageous to employ thermal or neutron-capture gamma ray detectors, a pulse source may be employed and the detector response taken after a substantial percent of the thermal neutrons present in the borehole have decayed. Compensation may be provided for thermal neutron absorbers present in the formation by employing a measurement of the thermal neutron decay time or other thermal neutron absorption characteristic measurements to correct response of these detectors to be substantially independent of the thermal neutron absorber content of the formation.

When thermal or neutron-capture gamma ray detectors are employed to produce the first pore volume indication, either or both of these detectors may be utilized with a pulsed neutron source to also provide a function representative of the thermal neutron absorption characteristic of the formation, such as $\tau$ or $\Sigma$. This may be accomplished by measuring the count rate at these detectors versus time after the termination of the neutron pulse.

The count rate may be sampled versus time by gating the time following each pulse into a number of time windows and computing the exponential decay time that corresponds to the count rate in two or more such time windows. Provisions are made to select the decay time so determined from the detector either nearest or farthest from the pulse neutron source, since under some circumstances, decay times from one detector will become unreliable because of unfavorable count rates. Also, count rates for the same time windows for a number of pulses may also be combined to provide more statistically accurate count rates for each window and thereby increase the accuracy of decay time determinations.

In one embodiment of the invention, measurements from two types of detectors are employed; i.e., epithermal neutron and thermal neutron (or neutron-capture gamma ray) type detectors, one type to measure the hydrogen-dependent response and the other the absorption-dependent response of the formation. The absorption-dependent response may also be used to determine the relative position of the detection gates and the neutron source pulse rate. Three detection gates may be employed with each detector, the latest gate for background and natural gamma ray measurements and the earlier gates for measuring neutron population decreases, both with time and distance. The ratios of the count rates from the gates employed on spatially separated detectors of the same type are combined with those of the other type to determine both the primarily hydrogen-dependent porosity measurement and the primarily absorption-dependent porosity measurement obtained from the same neutron source.

The measured decay time or other thermal neutron absorption characteristics may be utilized in another feature of the invention to first determine the absorption characteristic of the water component of the formation by combining this measurement with the pore volume indication primarily dependent upon the hydrogen content of a formation believed to be devoid of hydrocarbons.

This now determined absorption characteristic is then combined with the measured absorption characteristic of the formation on a continuous depth basis to provide a pore volume indication which will be uncompensated for any differences between the neutron absorption characteristic of the water and the characteristic of the fluids in formations traversed by the absorption characteristic measuring tool. The major condition causing this difference will be the presence of hydrocarbons. Therefore, their presence will be directly indicated by the differences between the pore volume indication which is primarily dependent upon the hydrogen content and the pore volume indication which is primarily dependent upon the absorption characteristic.

The pore volume indication which is primarily dependent upon the hydrogen content is preferably derived from the neutron log and is therefore designated $\phi_N$. The pore volume indication which is determined from the absorption characteristic of the formation is designated $\phi_\delta$. The differences between the $\phi_N$ and the $\phi_\delta$ may be utilized not only in indicating the presence of hydrocarbons over a relatively broad range of clay content and formation water salinities but may also be employed to provide an indication of the type of hydrocarbon present; e.g., $\phi_\delta < \phi_N$ indicates oil. When an independent approximation of total porosity is available, a direct indicator of the type of hydrocarbons present may be derived. Preferably, this porosity approximation is obtained from non-neutron measurements such as sonic or density. However, a rough approximation is often adequate for producing an indication of the type of hydrocarbons present. This hydrocarbon type indication may be expressed as a thermal neutron absorption characteristic for the hydrocarbons $\Sigma_n$.

The absorption dependent pore volume indication $\phi_\delta$ may be corrected for the case where the absorption characteristic of the pore contents is different from that originally assumed; i.e., different from an assumed hydrocarbon characteristic. When clays are present in the formation and when the formation water characteristics indicate that these clays may have neutron absorption characteristics substantially different from that of water, such as is encountered frequently where fresh waters are found, a further correction may be made and thus provide three absorption dependent pore volume indications. Differences in these three absorption dependent pore volume indications provide a knowledge of the presence and type of hydrocarbons and the possibility of invasion, thereby indicating that the formations are premeable. A further indicator is useful in evaluating producibility.

When formation conditions are such that no locations are known for formations which can be dependably assumed to be devoid of hydrocarbons and thereby utilized to predetermine the absorption characteristic for the water component of the formation, a reconnaissance pass may be utilized which includes an indicator optimized to select values for this characteristic. The value for this characteristic and the selection indicator are simultaneously derived from a shale indicator and the neutron measurements and, therefore, provide this value when the indicator reaches prescribed levels.

With this characteristic now determined, the apparatus parameters are accordingly adjusted and the technique applied throughout the borehole interval of interest. A continuous display versus depth is generated which readily indicates the presence of hydrocarbons even to the relatively unskilled analyst. Further, an indicator of the nature of the hydrocarbons; i.e., gas or oil of varying viscosity, is also provided as an aid to avoid confusing tar sands or the like with productive oil bearing beds.

For a better understanding of the present invention, together with other and further objects thereof, reference is made to the following description taken in connection with the accompanying drawings, the scope of the invention being pointed out in the appended claims.

BRIEF DESCRIPTION OF THE FIGURES

FIG. 1 illustrates apparatus for producing both hydrogen dependent and absorption-dependent measurements from a neutron tool in subsurface formations traversed by a borehole.

FIG. 2 illustrates an apparatus for controlling both the pulsing of a neutron source and the gating of detectors relative thereto and the transmission of the results thereby provided up the cable to surface signal processing and recording circuits.

Figure 3:
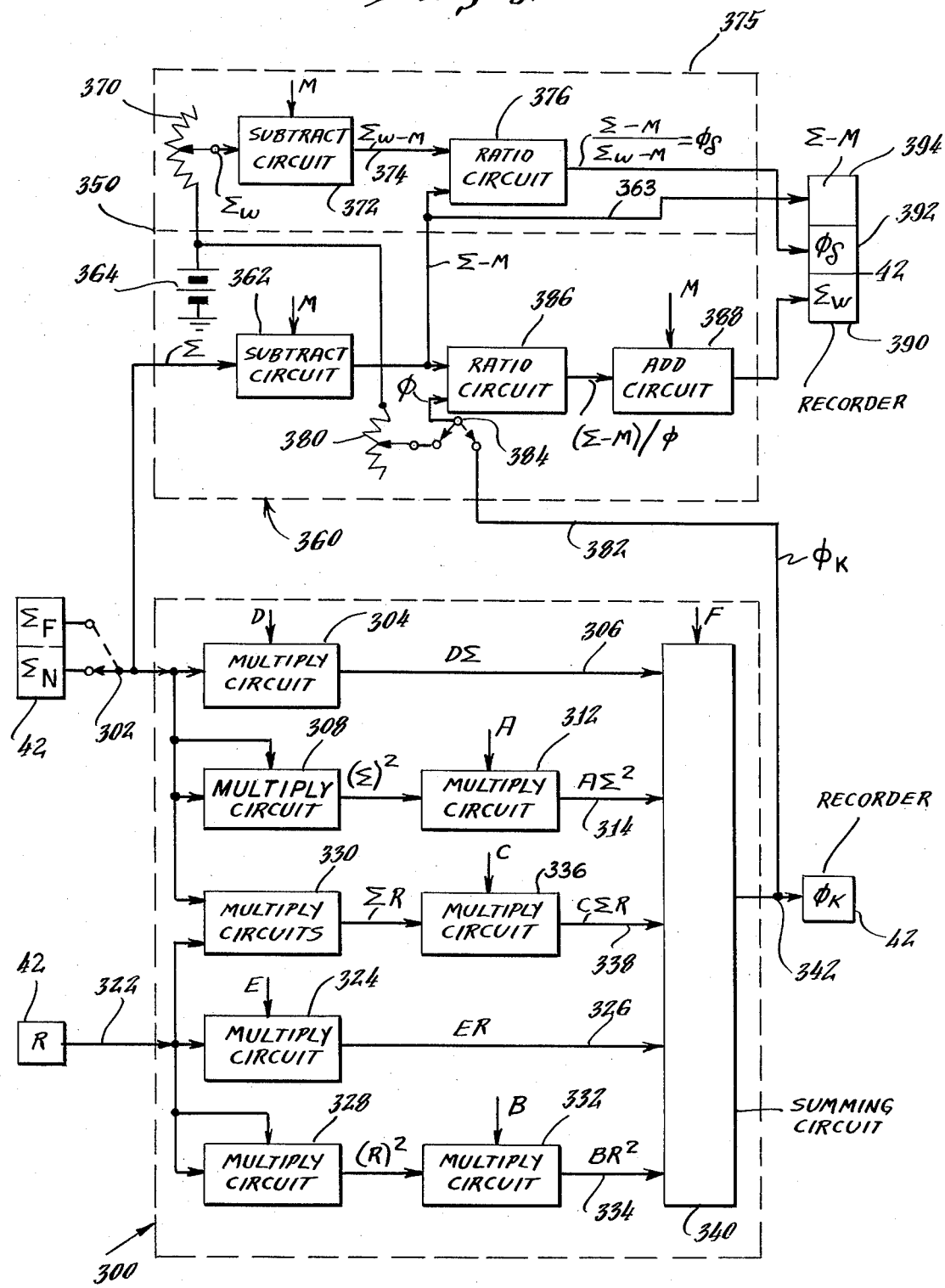
FIG. 3 illustrates apparatus for providing pore volume indications in accordance with one feature of the invention.

It is sometimes necessary to make simplifying assumptions in order to transform a borehole measurement into some sort of hydrocarbon indication. However, it is important to understand the effect of various complications upon such assumptions and more particularly, to make only assumptions which survive or can be later corrected for these complications.

It has been discovered that certain measurements may be combined using predetermined assumptions to produce compensating pore volume indications capable of detecting hydrocarbons. These measurements are the hydrogen-dependent and absorption-dependent neutron measurements. These measurements are combined in accordance with a particular technique to produce compensation for complications beyond certain assumptions such as to extend the usefulness of the measurements and further allow detection and compensation for deviations from some of the assumed conditions. For a better understanding of the advantages provided by these measurements, a brief review will now be provided.

When a cloud of high energy (high velocity) neutrons are introduced into a formation, they are slowed down by collisions with nuclei of similar mass (principally hydrogen). The more collisions, the less the velocity, and the shorter the distance the neutrons move in a given time from the point of origin. This distance may be considered as a slowing down length $L_S$. The number of collisions and therefore $L_S$ is somewhat dependent upon other elements in the formation but it is principally dependent upon the amount of hydrogen present.

Since the number of collisions is hydrogen-dependent and hydrogen is mostly contained in the liquids present in the pores of the formation, a measurement of $L_S$ is representative of the pore volume of the formation which contains liquids. If some of the pore space is filled with gas, the neutrons travel farther before being slowed down and $L_S$ increases. The ratio of the neutron populations between two differently spaced detectors would change accordingly and the pore volume provided assuming liquid fill conditions will be too low. For light oils, the hydrogen density is slightly less than that for water and the pore volume provided, assuming water, is only slightly low.

If hydrogen is present in substantial amounts in the formation of clays rather than as pore fluids, the pore volume provided assuming no clay will be too high. If the clays also contain neutron absorbers and if the neutron detectors are sensitive to thermal neutrons or capture gamma rays, this effect is even more pronounced and has limited the application of absorber-sensitive neutron logs. Similarly, variations in the chlorine concentration, particularly in fresher waters, complicate the response of neutron logs which have absorber-dependent aspects.

The presence of absorbers becomes important after the neutrons reach energy levels generally characterized as thermal and at which they are highly probable of being captured or absorbed by certain formation elements, if they are present. Thermal neutrons are traveling at much lower velocities but are, nevertheless, diffusing further from the source. How far they move depends upon the abundance and type of absorbers present and may be considered the thermal diffusion length $L_D$. This length is related to $\Sigma$ by the relationship $L_D = \sqrt{D/\Sigma}$ where D is the thermal neutron diffusion coefficient for the formation and like $L_S$, is also a function of the amount of hydrogen present.

The neutron capture process gives off gamma rays which are readily detectable if the capture occurs near an appropriate detector. It is possible, however, that so little hydrogen is present, as in gas saturated zones, that the neutrons travel well beyond a particular detector location before reaching thermal levels and subsequent capture. This case may correspond to $L_D$ ranges beyond the design for a given source-detector spacing. In such cases, compensation may be provided by then utilizing an additional detector located further from the source.

In contrast, where an abundance of both neutron moderators and absorbers; i.e., hydrogen and chlorine, are present, as in high porosity saline water bearing formations, the neutrons may reach thermal levels and be captured at much shorter $L_D$ values and the count rates at detectors located from the source well beyond this $L_D$ value will be too low for the reliable determination of $\Sigma$. It is therefore an important advantage to be able to compensate for either long or short $L_D$ cases by measuring $\Sigma$ at either of two different source-detector spacings. This particular advantageous embodiment is illustrated in FIG. 1.

It is well known that the use of the ratio of the response of two differently spaced detectors provides considerable compensation for borehole effects when applied to non-pulsed (chemical) sources. It is also known that when using pulsed sources, the neutrons in the borehole usually diminish more rapidly with time than those in the formation. Consequently, many absorption characteristic ($\tau$ or $\Sigma$) measurements are delayed for an appropriate time after the neutron pulse. However, this technique can be advantageously applied to hydrogen-dependent measurements as well. Further, it may be applied to all detectors, whether intended for hydrogen- or absorption-dependent measurements, and in fact, it is even possible to employ the ratios of such delayed measurements to provide still further compensation.

Since both hydrogen- and absorption-dependent characteristics are present in such measurements, separate hydrogen- and absorption-dependent responses may be derived from such measurements, which include these compensations and any further compensation provided by employing a common neutron source (therefore, there is no difference in source strength) and common measurement times (therefore, similar, if not complete, compensation for effects common to this period, such as tool position). Such an apparatus is illustrated in FIG. 1.

Referring now to FIG. 1, a fluid-tight, pressure-resistant tool 10 is adapted to be suspended in a cased borehole 12 by an armored cable 14 for investigating a subsurface earth formation 16. Although the neutron logging techniques described herein have special utility in cased hole logging, the invention has application as well to open hole logging.

The tool 10 includes pulsed neutron source 18 and two spaced radiation detectors 20 and 22, respectively referred to as the near and far detectors. Neutron source 18 is adapted to generate discrete pulses of high energy neutrons (14Mev) and may be of the types described in more complete detail in U.S. Pat. Nos. 2,991,364 issued to Goodman on July 4, 1961 and 3,546,512 granted to Frentrop on Dec. 8, 1970. The radiation detectors 20 and 22 are positioned to respond in proportion to the density of thermal neutrons in the formation 16 and to that end, may be of either the thermal neutron-sensitive type; e.g., helium-3 filled proportional counters, or they may be capture gamma-ray detectors; e.g., those of the sodium iodide scintillation crystal type which respond to gamma radiation resulting from the capture of thermal neutrons by the nuclei of certain formation elements.

In this embodiment, the detectors 20 and 22 are located on the same side of the neutron source 18 and preferably are positioned to pass adjacent to a given formation as the tool is moved through the borehole before the neutron source 18 so as to minimize high energy neutron activation effects. Typical spacings for the near and far detectors are approximately 13-½ and 25 inches from the neutron source. Although not shown, it will be understood that the tool 10 includes appropriate amplification circuitry for amplification of the radiation-related signals for transmission over the cable 14 containing conductors 24, 27 and 30 to signal processing circuitry 25 located at the surface, and discrimination circuitry to eliminate noise and other electrical signals that are unrelated to the desired nuclear processes under observation.

Depending upon the particular conditions, part or all of processing circuitry 25 may be located in the borehole tool 10. This will be discussed further in regard to FIG. 2. This circuitry includes a signal processing loop 26 referred to as a $\tau$ loop and may be of any construction appropriate to the derivation of $\tau$ and the subsequent control of three detection interval gates and the pulse rate and width of the neutron source. For example, the circuitry may be of the type described in the previously mentioned U.S. Pat. No. 3,662,179 issued to Frentrop, et al. This circuitry operates on the radiation related signals from one of the detectors, here illustrated as near detector 20, to derive an apparent value of $\tau$ which corresponds to the rate of decay of the thermal neutron population at that detector; i.e., in this case $\tau_{near}$ or $\tau_N$.

In accordance with the teachings of the above patent, the operation of neutron source 18 is controlled as a function of the measured value of $\tau$. That is to say, both the duration of the individual neutron pulses and the elapsed time between successive pulses are varied in proportion to $\tau$. Hence, in FIG. 1, the $\tau$ loop 26 is shown also connected to the neutron source 18 by conductor 30 so as to cause the source 18 to emit neutron pulses that are a specified multiple of $\tau$ in duration with each pulse occurring at periods which are a different specified number of multiples of $\tau$. During this period between pulses, a plurality of time gates corresponding to different intervals in this period are also generated and, as illustrated in FIG. 1, correspond to gates I, II, and III in the order of their occurrence. The count rates observed in these windows are used in turn to determine $\tau$. The count rates observed in each of these time gates are collected and averaged over a large number of pulses to make the $\tau$ determination.

Since typical $\tau$ values are in the order of a few hundred microseconds, one period, for example, would correspond to operating the neutron source for several hundred microseconds, then waiting for one or two $\tau$; i.e., several hundred more microseconds before collecting the counts $T_1$ corresponding to gate I over an interval corresponding to $\tau$, then collecting the counts $T_2$ corresponding to gate II over an interval following gate I but longer, as for example $2\tau$, and finally, thereafter collecting the counts $T_3$ corresponding to gate III which typically is an interval in the order of $3\tau$ long, and occurring late enough after termination of the neutron burst to be utilized as background corrections.

Thus, the period between pulses is typically on the order to 10 or more $\tau$ and therefore in the order of several thousand microseconds. Preferably, $\tau$ is determined using relatively long time constant circuits and the count rates $T_1$, $T_2$ and $T_3$ corresponding to each of the three gates, accumulated from many pulse periods. If the time intervals for each of these gates is respectively 1, 2 and $3\tau$ long, the count rates from these gates may be combined in accordance with the relation $T_1 - 1/3T_3 = /T_2 - 2/3T_3$ approximately 2. If this ratio differs from 2 over several neutron pulses, the value of $\tau$ is adjusted accordingly, as described in the previously mentioned Frentrop, et al. U.S. Pat. No. 3,662,179.

Referring to FIG. 1, as shown by interconnecting lines 32, 34 and 36, corresponding to the three above-described gates, the signals from the far detector 22 may be routed via conductor 27 to separate far signal gating and counting circuits 38 for collection and averaging, using suitable time-constant circuits, of the count rates corresponding to these same gates but now at the far detector. Accordingly, and as illustrated in FIG. 1, the corresponding count rates for the near N and far F detectors for each of these gates are designated as $N_1$, $N_2$ and $N_3$ and $F_1$, $F_2$ and $F_3$. As shown, the $\tau$ loop circuitry 26 automatically derives $\tau_N$ which may be converted to $\Sigma_N$ by circuitry 44, using the previously described $\tau$-$\Sigma$ relationship.

Many of the above circuit components are also described in co-pending U.S. patent application Ser. No. 356,151 filed May 1, 1973 by W. B. Nelligan, which is now continued as Ser. No. 520,958 filed on Nov. 4, 1974.

As shown in FIG. 1, a separate $\tau$ loop 40 may also be included. While not active in controlling the time or pulse rate of the neutron source, this loop acts in a manner similar to $\tau$ loop 26 to provide separate gates relative to the termination of the source pulse as signaled via line 30. These gates are applied to the output of the far detector as supplied via line 27. The width and position of the gates are adjusted relative to the $\tau$ value needed to hold the above-described relationship used in circuit 26 to a constant value of about 2.0. In this manner, this loop produces a $\tau_F$ on line 130 which may be utilized when switch 132 connects it to another $\tau$ to $\Sigma$ converter 44A to produce $\Sigma_F$, now corresponding to the far detector.

From the above description it can be seen that measurements corresponding to $\tau$, $\Sigma$, $T_1$, $T_2$ and $T_3$ for both the near and far detectors are now available for recording on recorder 42. This recorder may be of either analog or digital types and may use magnetic tape or disc recording media. As shown in FIG. 1, the recording may be synchronized to borehole depths as supplied by depth increment signals on line 43 using well-known techniques. Alternatively, the recording may be in digital devices included as part of a well site digital computer or microprocessor system or a digital transmission system to such devices located remote to the well site.

An alternative method of deriving $\tau_F$ is also shown in FIG. 1, which may be practiced either at the well site using the illustrated circuits 80 and 124 or by using other means such as the digital computer or microprocessor mentioned above. In this case, $\tau_F$ is derived from the same $F_1$, $F_2$ and $F_3$ measurements obtained from gating circuit 38, which uses the gates supplied by the $\tau$ loop 26.

Circuit 80 corresponds to a $F_1(net)/F_2(net)$ deriving circuit and as shown in FIG. 1, comprises the following: a divide by 3 circuit 92 utilizes input of $F_3$ via line 82 to obtain $1/3F_3$ for output on line 94 to a times 2 circuit 96 and on line 100 to subtract circuit 104. The output of times 2 circuit 96 on line 98 responds to $2/3F_3$ and is subtracted from $F_2$ input on line 84 by circuit 102 to provide $F_2(net)$ as $F_2-2/3F_3$ on line 106. The output of the divide by 3 circuit 92 on line 100 is subtracted from $F_1$ input on line 86 by circuit 104 to provide $F_1(net)$ as $F_1-1/3F_3$ on line 108. The lines 106 and 108 are input to ratio circuit 110 which produces the $F_1(net)f_2(net)$ ratio as output on line 120.

As described in co-pending U.S. application Ser. No. 356,150 filed May 1, 1973 by C. W. Johnstone, issued June 17, 1975 as U.S. Pat. No. 3,890,501 $F_1(net)/2F_2(net)$ is directly related to $\tau_N/\tau_F$. Thus, when $\tau_N$ is input by line 122 via recorder 42 or directly from the output of the $\tau$ loop 26, $\tau_F$ may be divided out of this ratio by circuit 124 and output on line 126 where it may be used via switch 132 in lieu of that otherwise supplied by $\tau_F$ loop 40.

From the above description it is now clear how neutron absorption characteristics either in the form of $\tau$ or $\Sigma$ may be produced and recorded from the $T_1$ through $T_3$ gates obtained from either detector. It will now be described how the hydrogen-dependent characteristic may be produced by combining these same signals. As illustrated by ratio circuit 50 in FIG. 1, a background compensated ratio of the near and far detector responses may take the form of:

$$R = N_1 - 1/3N_3/(F_1+F_2-F_3) = N(net)/F(net) \text{ EQ} \quad (3).$$

This ratio is produced by inputting $N_3$ to another divide by 3 circuit 45 to produce $1/3N_3$, which is then subtracted from $N_1$ in circuit 46 to produce near detector net signal $N_1-1/3N_3$. For the far detector where statistics are more a problem, $F_1$ and $F_2$ are added in circuit 52 from which $F_3$ is subtracted in circuit 54 to provide the far detector net signal $F_1+F_2-F_3$. The ratio of these combined net detector signals is then produced in circuit 48 and may be recorded as R as shown in FIG. 1 on recorder 42.

This ratio is directly related to formation porosity in the case where neutron diffusion and absorption effects are not significant factors, but it is preferred to correct this ratio by combining it with one of the neutron absorption characteristic measurements, as will be described herein in relation to FIG. 3, or as described in the above-mentioned co-pending Nelligan application Ser. No. 356,151.

As previously mentioned, all or part of the above-described circuitry may be located in the tool 10. FIG. 2 illustrates one downhole circuit 60 which may be used with either the near or far detector. In this case, the part of the circuit which is associated with a given detector has been separately designated as circuit 70. Neutron source 18 is connected to the $\tau$ loop 26A which is similar to $\tau$ loop 26 already discussed, and controls the on-off cycles of the neutron source pulses in the same manner. It also derives $\tau$ appropriate for whichever detector is associated with circuit 70 which is output on line 68 for inclusion with common cable driving circuit 78 for amplification and conditioning for transmission up the cable 14 to the surface.

Also output are the $\tau$ related gates I through III, but now controlled, respectively, by gate circuits 72, 74 and 76 to enable the counts received from a given detector to be passed to the cable driving circuit 78. It will be recalled that time gates $T_1$, $T_2$ and $T_3$ do not overlap and accordingly, may be transmitted in sequence during adjacent time intervals. Corresponding circuitry (not shown) at the surface then de-multiplexes these signals and supplies them for utilization as previously described in FIG. 1 as either $\tau_N$ and $N_1$ through $N_3$ or $\tau_F$ and $F_1$ through $F_3$. A separate circuit 70 connected to the other detector may utilize the $\tau$ derived gates via lines 62, 64 and 66 to gate and transmit this detector's response uphole over a different conductor.

Referring now to FIG. 3, there are shown circuits corresponding to apparatus for utilizing the above-described measurements in accordance with this invention. As illustrated, FIG. 3 comprises two distinct circuits, each capable of deriving a pore volume indication. Circuit 300 utilizes the previously derived ratio R in combination with the previously derived neutron absorption characteristic, here illustrated as either $\Sigma_{near}$ or $\Sigma_{far}$ as determined by switch 302, to produce pore volume indication $\phi_k$ which is primarily hydrogen-dependent, since it is compensated by this combination with the absorption characteristic. Circuit 360 provides a contrasting absorption-dependent pore volume indication $\phi_\Sigma$ which is uniquely derived from either $\Sigma_{far}$ or $\Sigma_{near}$ as also determined by switch 302.

As illustrated by circuit 300 of FIG. 3, the relationship between $\phi_k$ and the detector response ratio R and $\Sigma$ may be expressed by an equation in the form of the following:

$$\phi_k = A\Sigma^2 + BR^2 + C\Sigma R + D\Sigma + ER + F.$$

The values of the coefficients A through F vary in accordance with borehole size, salinity, etc., as well as the nature and spacings of the detectors used to derive R and $\Sigma$. Since these variations may be extensive, only a few exemplary cases for the previously described spacing and sodium iodide scintillation-type gamma ray detectors will be provided herein:

| B.H. SIZE | CSG. SIZE | SAL. × 10K | A × 10$^{-4}$ | B × 10$^{-2}$ | C × 10$^{-2}$ | D | E × 10$^{-2}$ | F |
|---|---|---|---|---|---|---|---|---|
| 8.0 | 5.5 | 5 | +.26080 | −.988990 | +.052258 | +.2121058 | −.783643 | −.143222 |
| 8.0 | 5.5 | 0 | −.15039 | −.095272 | +.017709 | +.1590970 | −.922945 | −.023328 |
| 10.0 | 7.0 | 5 | +.73180 | −.099811 | −.012519 | +.1893690 | −.834616 | −.116355 |
| 10.0 | 7.0 | 0 | −.58070 | +.501110 | −.008876 | +.1442065 | −.917200 | −.022568 |
| 12.0 | 7–9 | 5 | +.76199 | −.120360 | +.023813 | +.1938780 | −.960474 | −.117296 |
| 12.0 | 7–9 | 0 | −3.2275 | −.093764 | +.231873 | +.1483610 | −.954850 | −.029052 |

B.H. size is borehole diameter size in inches.
CSG. size is casing diameter size in inches.
SAL. is casing fluid salinity in parts per 10,000.

Since the borehole and casing size (in inches) as well as the salinity of the fluid filling the casing is known in advance, the values of the corresponding A through F coefficients can be readily selected from the above table and input as constants to circuit 300 of FIG. 3 before starting the logging operation. For example, these values may be placed on digital thumbwheels, not shown, each connected to its corresponding circuit. As is clear from the magnitude of some of these coefficients, their use and the corresponding circuits may be omitted if desired.

Pore volume indication $\phi_k$ is then derived from the $\Sigma$ input from switch 302, used here for absorption effect compensation, and the ratio R input on line 322 to produce the products $D\Sigma$ and $ER$ on outputs 306 and 326 using multiply circuits 304 and 324, respectively; $\Sigma \times \Sigma$ and $R \times R$ using multiply circuits 308 and 328, respectively; which are then multiplied in turn by A and B in circuits 312 and 332 to obtain $A\Sigma^2$ and $BR^2$ on outputs 314 and 334, respectively; and cross-product $\Sigma R$ in circuit 330 which is then multiplied by C in circuit 336 to obtain $C\Sigma R$ on output circuit 338. These outputs 306, 314, 326, 334 and 338 are then summed along with F in summing circuitry 340 to obtain $\phi_k$ on output 342. This ratio-derived, hydrogen-dependent and absorber-compensated pore volume indication may also be recorded by recorder 42 for later use or utilized as will now be described in conjunction with circuit 350 as shown in FIG. 3.

Circuit 360 and particularly, circuit 375, both part of circuit 350, as shown in FIG. 3, input the absorption characteristic $\Sigma$ selected by switch 302, the setting of which is determined by conditions already discussed. Besides $\Sigma$ from either the near or the far detector, the characteristic $\tau$ could also be used. Circuit 360 determines an absorption characteristic value $\Sigma_w$ for the formation water component and requires in addition to $\Sigma$, a porosity input. Depending upon the setting of switch 384, this input $\phi$ may be either manually supplied for a given formation assumed to be non-hydrocarbon bearing via the setting of potentiometer 380 or continuously supplied via line 382 as the output of previously described circuit 300. Circuit 360, as illustrated in FIG. 3, uses the following relationship:

$$\Sigma_w = \Sigma - M/\phi + M \quad \text{EQ.} \quad (4),$$

where M is a value corresponding to an approximation of both $\Sigma_{ma}$ and $\Sigma_n$, assumed to be gas. Advantageously, this value may be considered as equal to 10 for most applications. It is also employed in circuit 375 to produce the absorption-dependent pore volume indication $\phi_\delta$ using the relation:

$$\phi_\delta = \Sigma - M/\Sigma_w - M \quad \text{EQ.} \quad (5).$$

The constant M, like the coefficients used in circuit 300, may also be digitally dialed in before logging, but since it is much less likely to change even for different borehole sizes, etc., it may be built into the circuit.

Figure 6:
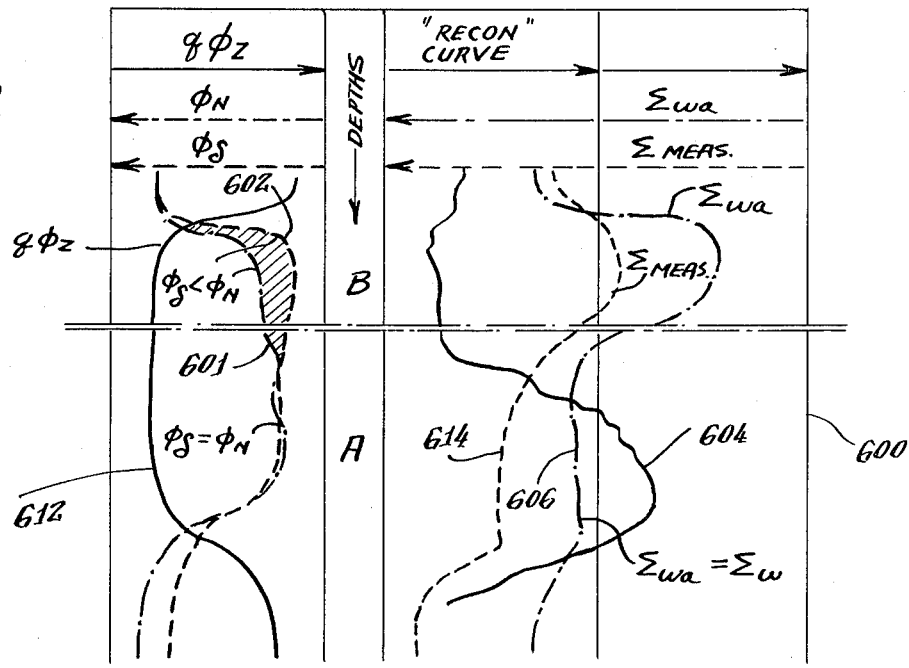
FIG. 6 illustrates one form the indications of the presence of hydrocarbons produced in accordance with the invention may take.

Referring to the components shown in FIG. 3, M is subtracted from the $\Sigma$ input supplied from switch 302 by circuit 362 to produce the $\Sigma - M$ output used as input to ratio circuits 376 and 386 and output on line 363 for later use and recording at 394. Ratio circuit 386 also inputs previously described $\phi$ value (either from potentiometer 380 or line 382 according to switch 384) to provide the ratio $(\Sigma - M)/\phi$, which is then combined with M in add circuit 388 to produce $\Sigma_w$. Of course, it is understood that $\Sigma_w$ corresponds to $\Sigma_{wa}$ when it cannot be assumed that the formations are non-hydrocarbon bearing. Nevertheless, it is useful to derive $\Sigma_w$ and to display it as $\Sigma_{wa}$ to determine or confirm the actual $\Sigma_w$ value used to derive $\phi_\delta$. Accordingly, it may be recorded as shown at 390 on recorder 42 and displayed continuously as shown in FIG. 6.

Figure 8:
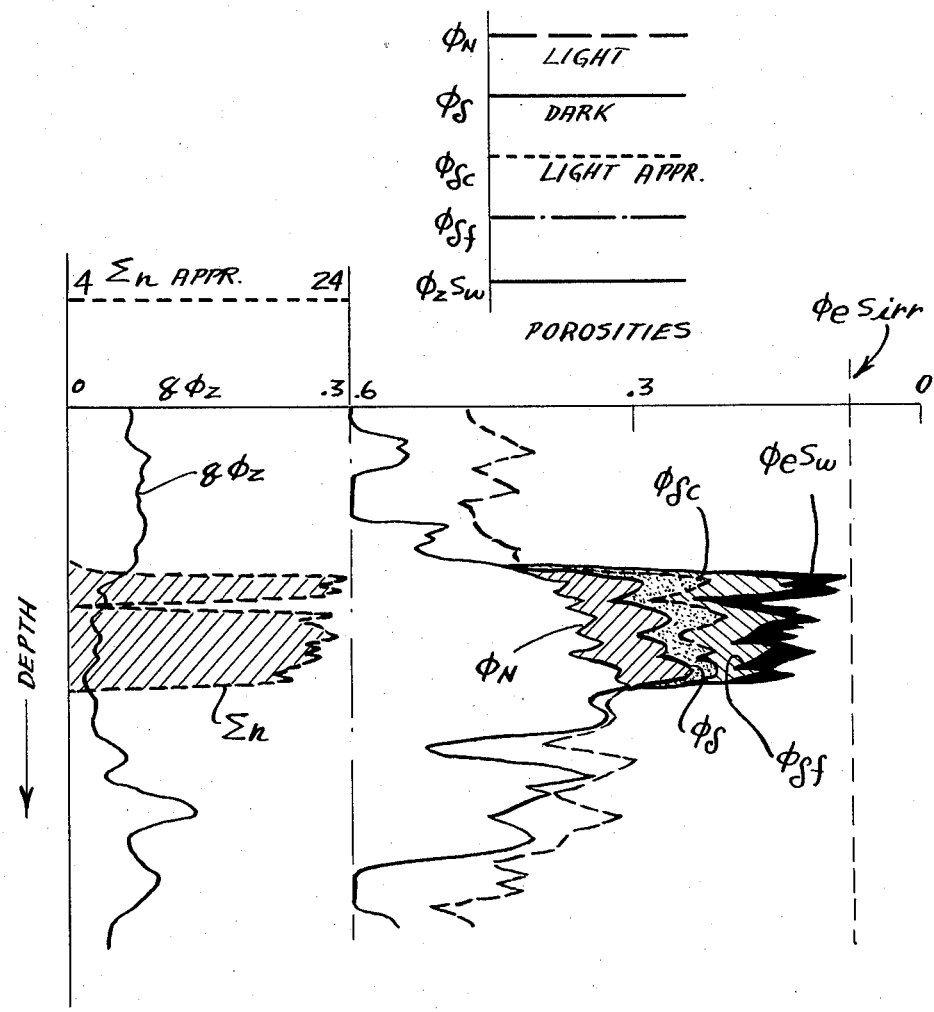
FIG. 8 illustrates another form the indications of the presence of hydrocarbons in subsurface earth formations may take.

$\Sigma_w$ may be manually supplied, like $\phi$, using the potentiometer 370 of FIG. 3. Both potentiometers 370 and 380 may be supplied by a common reference voltage from a constant voltage source 364. The constant M may be subtracted from this $\Sigma_w$ by circuit 372 to provide $\Sigma_w - M$ on line 374 or this difference, which is substantially a constant in many cases, may be provided directly by a potentiometer. This relatively constant value is then combined with the varying signal Σ - M in ratio circuit 376 to produce $\phi_\delta$. This pore volume indication may be recorded as shown at 392 on recorder 42 or displayed as a function of depth on a continuous basis as illustrated in FIGS. 6 and 8, as will be discussed later.

Figure 4:
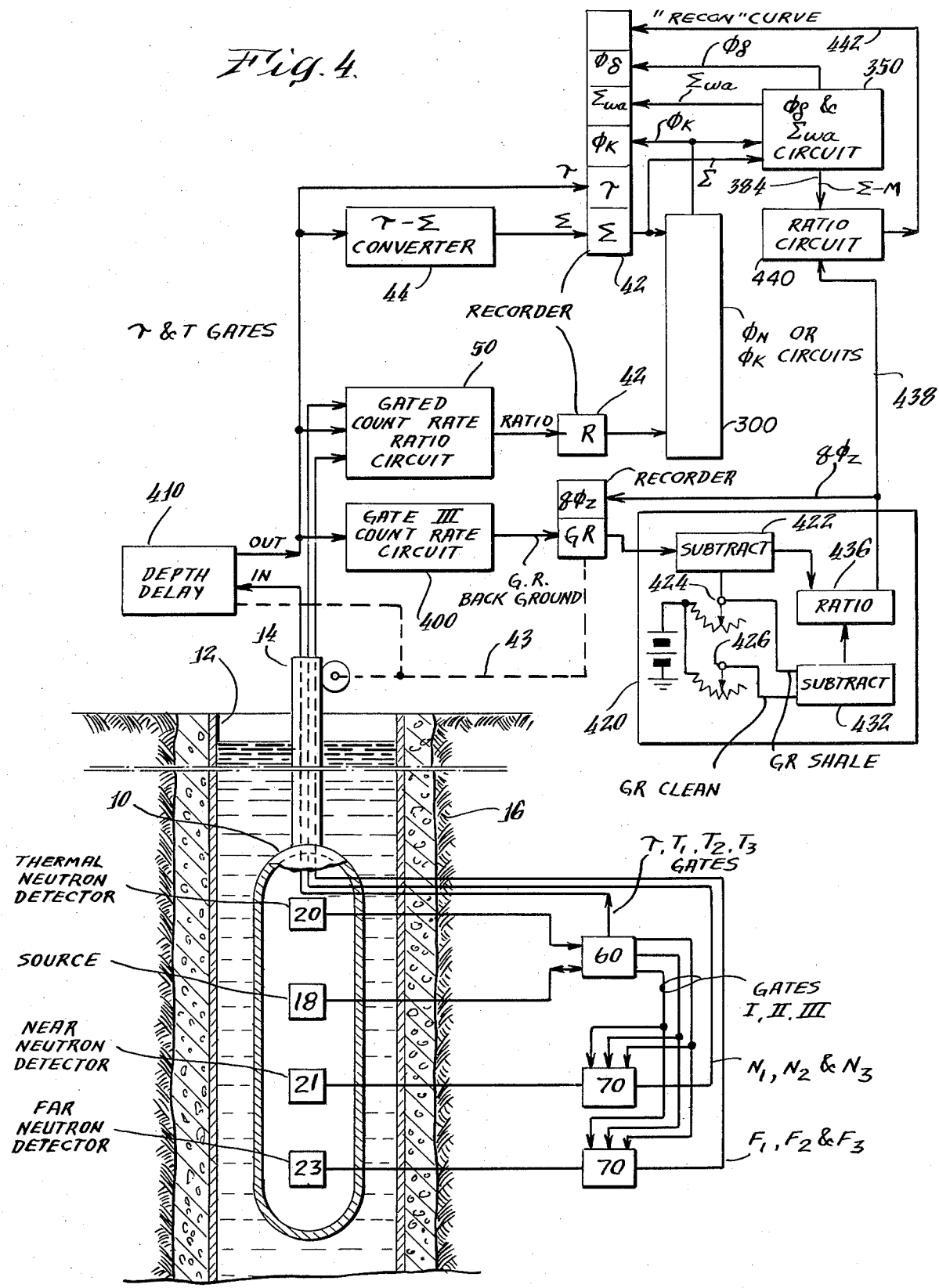
FIG. 4 illustrates another embodiment of the invention using different types of detectors and circuits to provide additional features of the invention.

Now referring to FIG. 4, there is shown an alternative embodiment of the invention which utilizes some of the abovedescribed circuits. As previously discussed, the hydrogendependent pore volume indication may be derived using epithermal neutron detectors. In such a case, a separate thermal neutron detector is necessary to measure the absorption characteristic. Accordingly, as shown in FIG. 4, a neutron source 18 is used in conjunction with thermal neutron detector 20 separately spaced ahead of (here, above) the neutron source 18 as previously described in regard to FIG. 1.

This source 18 may be controlled by the value of $\tau$ derived by the downhole $\tau$ loop 60 previously described in regard to FIG. 2. In addition the three time gates $T_1$ through $T_3$ are also provided which, as shown in FIG. 4, are used not only in conjunction with detector 20 but also detectors 21 and 23 spaced below source 18. These gates are applied to two separate detector-related circuits 70. This circuit has also been described in regard to FIG. 2. As illustrated in FIG. 4, it is used to provide count rates corresponding to $N_1$ through $N_3$ and $F_1$ through $F_3$, from detectors 21 and 23 respectively, employing the techniques already described in regard to circuits disclosed in FIGS. 1 and 2.

Cable driving circuits 78 contained in downhole circuits 60 and 70 gate and transmit the three detector responses to separate uphole circuits 44 and 50 which have already been described, to respectively produce absorption characteristics $\tau$ and $\Sigma$ and the ratio R. Since now the absorption characteristics are derived ahead of the hydrogen-dependent signals, a depth delay 410 is employed to delay these characteristics to a depth corresponding to detector 21 or 23. This depth delay may be any of several well known devices.

As previously described in regard to FIG. 3, the $\Sigma$ and R values may now be combined in circuit 300, the details and description of which are discussed in regard to FIG. 3, to provide pore volume indicator $\phi_k$. This porosity value may also be input along with $\Sigma$ to previously described circuit 350 to derive $\Sigma_w$ or $\Sigma_{wa}$, and, if desired $\phi_\delta$, all of which may be recorded on recorder 42 as shown in FIG. 4. Also $\Sigma$ - M may be derived for input to ratio circuit 440.

FIG. 4 illustrates three new circuits, the Gate III count rate circuit 400 which provides a gamma ray background, GR, and the related $q\phi_z$ circuit 420 and ratio circuit 440. The Gate III count rate circuit is of conventional design and provides the background count rate provided by detector 20 during $T_3$. If preferred, a separate conventional gamma ray detector, not shown, located separately above detector 20 may be used to provide a response representative of shale or clay content of the formations. The relationship between the gamma ray and shale or clay content is described in the prior art. Circuit 420 implements this relationship as follows:

$$q\phi_z = K(GR-GRC)/(GRS-GRC) \quad \text{EQ.} \quad (6);$$

where GR is the gamma ray measurement, GRC is the corresponding gamma ray measurement value observed in clean formations; GRS is the corresponding gamma ray measurement value observed in shale; and K, a constant generally taken as 0.20 to 0.25.

In circuit 420 shown in FIG. 4, potentiometers 424 and 426 respectively provide GRS and GRC, the GR shale and GR clean constants which are subtracted in circuit 432 to provide the denominator in EQ. (6). GR shale is also subtracted from GR in circuit 422 and these signals applied to circuit 436 to derive a ratio corresponding to $q\phi_z$ on output line 438. K may be incorporated in ratio circuit 436. Either or both the gamma ray or $q\phi_z$ may be recorded on a continuous depth basis as a shale indicator. The $q\phi_z$ measurement is preferred and is shown in FIGS. 6 and 8.

It should be understood that in the case where detectors 21 and 23 shown in FIG. 4 are significantly absorption-effect independent, the compensation provided by $\Sigma$ in circuit 300 is unnecessary and may be omitted. However, it should be recognized that in such a case, the coefficients normally applied to the R input will need to be adjusted for this type of detector. In cases where epithermal neutron detectors are used to derive the hydrogen-dependent pore volume indication; i.e., no compensation for absorption is necessary, the notation $\phi_N$ rather than $\phi_k$ is appropriate.

The $q\phi_z$ output from circuit 420 on line 438 and $\Sigma$ - M output from circuit 350 on line 384 may be combined as shown in FIG. 4 in ratio circuit 440 to derive a "Recon" signal on line 442 which is essentially the ratio of these two outputs with a small positive offset (s) added to the $q\phi_z$ denominator to prevent it from reaching zero. This reconnaissance signal may be recorded preferably along with $\Sigma_{wa}$ on recorder 42 or displayed as shown as curve 604 in FIG. 6. It will be further described in regard to block 512 of FIG. 5 and EQ. (7).

In regard to deriving $q\phi_z$ from EQ.(6) which includes the constant K, if desired, K may be varied in accordance with the following relation:

$$K = 2\phi_z^2/(2\phi_z + 1) \, 0.6 \quad (6A).$$

$\phi_z$ corresponds to the maximum expected porosity value and may be taken as the maximum $\phi_k$ or $\phi_N$ value observed in the more clean porous formations, perhaps during the descent into the borehole.

Figure 5:
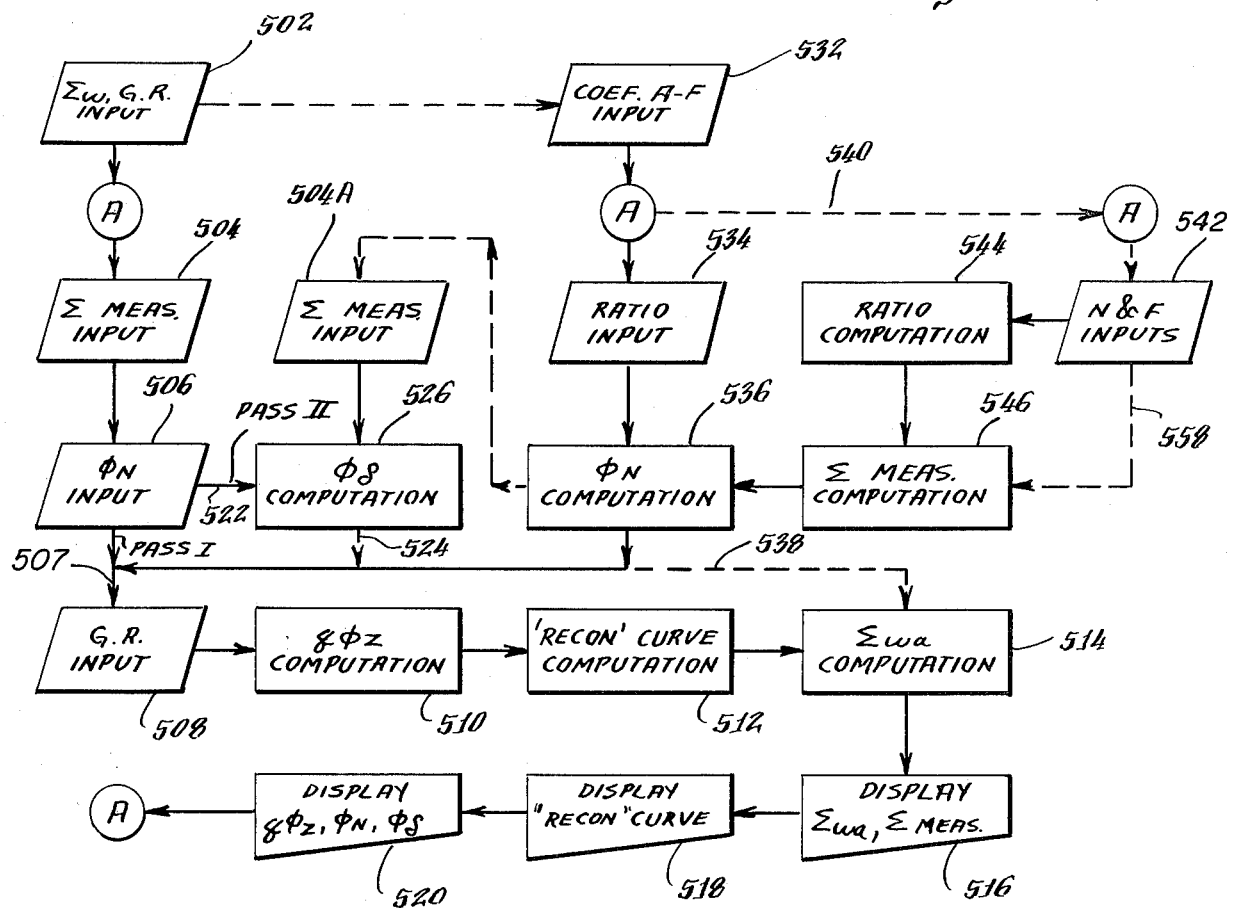
FIG. 5 illustrates some of the various forms the processes comprising the invention may take in accordance with availability of different measurements and predetermined values.

FIG. 5 illustrates procedural variations of the techniques described herein which may be taken in accordance with available input, as may be the case when the borehole has already been logged by existing tools which may provide only part of the previously described input. For example, if only $\Sigma$, $\phi_N$ and gamma ray measurements are available, the technique may be practiced by beginning at block 502. If however, $\phi_N$ is not available, but the measurements normally supplied with a two-spacing thermal decay time log are available, the initial process may include blocks 532 and 534. If, as is sometimes practiced, tape recordings of individual detector responses are made during logging, they may be utilized in the process by substituting blocks 542 and 544 for block 534.

Beginning at block 502 in FIG. 5, the constants $\Sigma_w$ and K, GRC and GRS, for the GR, may be input as an initial step. Then, as shown in blocks 504 and 506, the $\Sigma$ and $\phi_N$ measurements are input for a given depth. As will be recalled, the value of $\Sigma_w$ is required for the computation of $\phi_\delta$. If this value has not yet been derived, it is preferred that a reconnaissance pass be made for that purpose. Accordingly, as shown by branch 507 (PASS I) to block 508, the gamma ray is input for this depth and a measurement $q\phi_z$ computed as indicated at block 510 in accordance with EQ. (6) already described in regard to circuit 420 of FIG. 4. EQ. (6) uses the gamma ray constants K, GRC and GRS input in block 502.

In this PASS I, and as shown in block 512 of FIG. 5, it is preferred to derive a curve optimized to enable the proper determination of the $\Sigma_w$ value. The curve is denoted as a reconnaissance curve or simply "RECON" curve as shown in FIG. 6. It is derived in accordance with the relation $$(\Sigma - M)/(q\phi_z + s) \quad \text{EQ.} \tag{7}$$

The parameter $q\phi_z$ which occurs here in the denominator may approach zero in shale-free formations. To prevent dividing by zero, a small value s such as 0.01, is added to it. The numerator $\Sigma - M$ (where M can be taken as 10) increases with the amount of chlorine-bearing water. It will therefore be understood that the maximum values for this curve will correspond to the cleanest and highest porosity water-bearing formations and thus indicate the proper formations for determining $\Sigma_w$, either by adjusting potentiometer 370 as shown in FIG. 3 or by reading the $\Sigma_w$ value corresponding to this formation as output at 390 as shown in FIG. 3, or in more complicated cases, by techniques yet to be discussed in regard to FIGS. 9 and 10. The $\Sigma_w$ value may be provided as indicated in block 514 by EQ. (4) already discussed and should be regarded as $\Sigma_{wa}$ rather than $\Sigma_w$ when hydrocarbons or excessive amounts of clay are present.

Thus, in the initial pass, the above-derived measurements are displayed versus depth; $\Sigma_{wa}$ as illustrated in block 516, the RECON curve as illustrated in block 518, and $q\phi_z$ as illustrated in block 520 of FIG. 5, to assist in determining $\Sigma_w$. Optionally, this display may include both the $\Sigma$ and $\phi$ values actually measured, the latter shown as $\phi_N$ and, if an initial estimate of $\Sigma_w$ is available, the $\phi_\delta$ measurement derived by including block 526 and displayed as shown in block 520 of FIG. 5. These latter two $\phi$ values are also useful in determining $\Sigma_w$. As shown in FIG. 6 at Point A, $\phi_\delta$ and $\phi_N$ (curves 601 and 602) are essentially equal in value at the same time that $q\phi_z$ (curve 612) is at its lower values while RECON curve 604 is at its highest values, and as now understood, where $\Sigma_{wa} = \Sigma_w$. In this manner, utilizing the circuits illustrated in FIG. 3, it is possible to determine $\Sigma_w$ simply by adjusting the potentiometer 370 until $\phi_\delta = \phi_k$ (or $\phi_N$) in an essentially clean formation which is porous but nonhydrocarbon bearing. Once this adjustment is made, hydrocarbons are indicated by differences between $\phi_\delta$ and $\phi_N$ (or $\phi_k$) and as illustrated in Zone B of FIG. 6.

Referring again to FIG. 5 for an additional procedure now corresponding to the use of a two-detector system to derive $\phi_N$, appropriate coefficients A through F as utilized in circuit 300 already described, are input as indicated at block 532, their values depending upon whether these detectors are hydrogendependent or hydrogen and absorber-dependent. If the ratio is already available, it may simply be input as illustrated in block 534. If, however, as illustrated by branch 540 of FIG. 5, the ratio of the appropriate responses of the two detectors was not available, it may be computed as illustrated in block 544, from the gated detector responses $T_1$, $T_2$ and $T_3$ for the near and far detectors, if available, as input as illustrated in block 542. The ratio is computed in accordance with the appropriate relationship already described to derive both the ratio, as indicated in block 544 and $\Sigma_{measured}$ as indicated in block 546.

If the ratio is already available as part of the N & F inputs, block 544 may be bypassed as indicated by optional branch 558. With the ratio available, along with $\Sigma$ if absorption compensation is desired as determined by the A-F coefficients input at block 532, $\phi_N$ may be derived as shown at block 536. If $\Sigma$ was not computed as in block 546, it may be input as shown at block 504A.

Again depending upon whether $\Sigma_w$ is available, the procedure may continue as indicated to either block 526 to compute $\phi_\delta$ (PASS II) or bypass this step. Depending upon the availability of the gamma ray, blocks 508, 510 and 512 may also be bypassed and the process continue via branch 538 to perform the $\Sigma_{wa}$ computation illustrated in block 514. It should be understood the omitted computations are also omitted in the display steps shown in blocks 516 through 520. In the continuous depth mode the process continues after displaying the appropriate measurements such as illustrated in FIGS. 6 and 8 by returning to point A of FIG. 5 to input new measurements corresponding to a new depth. In most cases, the same values for the initial constants would still be used but, if necessary, as for instance where a change in the nature of the formation or formation water indicated, new values may be input.

In review, PASS I may exclude the $\phi_\delta$ computation shown in block 526 since $\Sigma_w$ is required but would normally include the $q\phi_z$, RECON curve and $\Sigma_{wa}$ computations used to determine $\Sigma_w$. PASS II would normally exclude the RECON curve and $\Sigma_{wa}$ computation but include the $\phi_\delta$ computation once $\Sigma_w$ is determined.

Referring now to FIG. 6, there is illustrated one form the pore volume indications $\phi_N$ (601) and $\phi_\delta$ (602) may take. Included are auxiliary curves $q\phi_z$ (612), the reconnaissance curve (604), the $\Sigma_{wa}$ (606) and $\Sigma_{measured}$ (614). By convention, the porosity curves are shown increasing to the left. As previously discussed, Zone A is suitable for determining $\Sigma_w$ using the PASS I measurements and Zone B indicative of the presence of hydrocarbons.

In regard to $q\phi_z$, it should be understood that, while illustrated here as being derived from the gamma ray measurements, $q\phi_z$ may be also derived from open hole logs such as by well known density-neutron and density-sonic combination techniques. In some cases, it may be derived from the S.P. measurement. Such alternative sources may be used in cases where the gamma ray response cannot be related to clay content, as for example, in cased boreholes which have radioactive salt deposits as the result of prior production.

Figure 7:
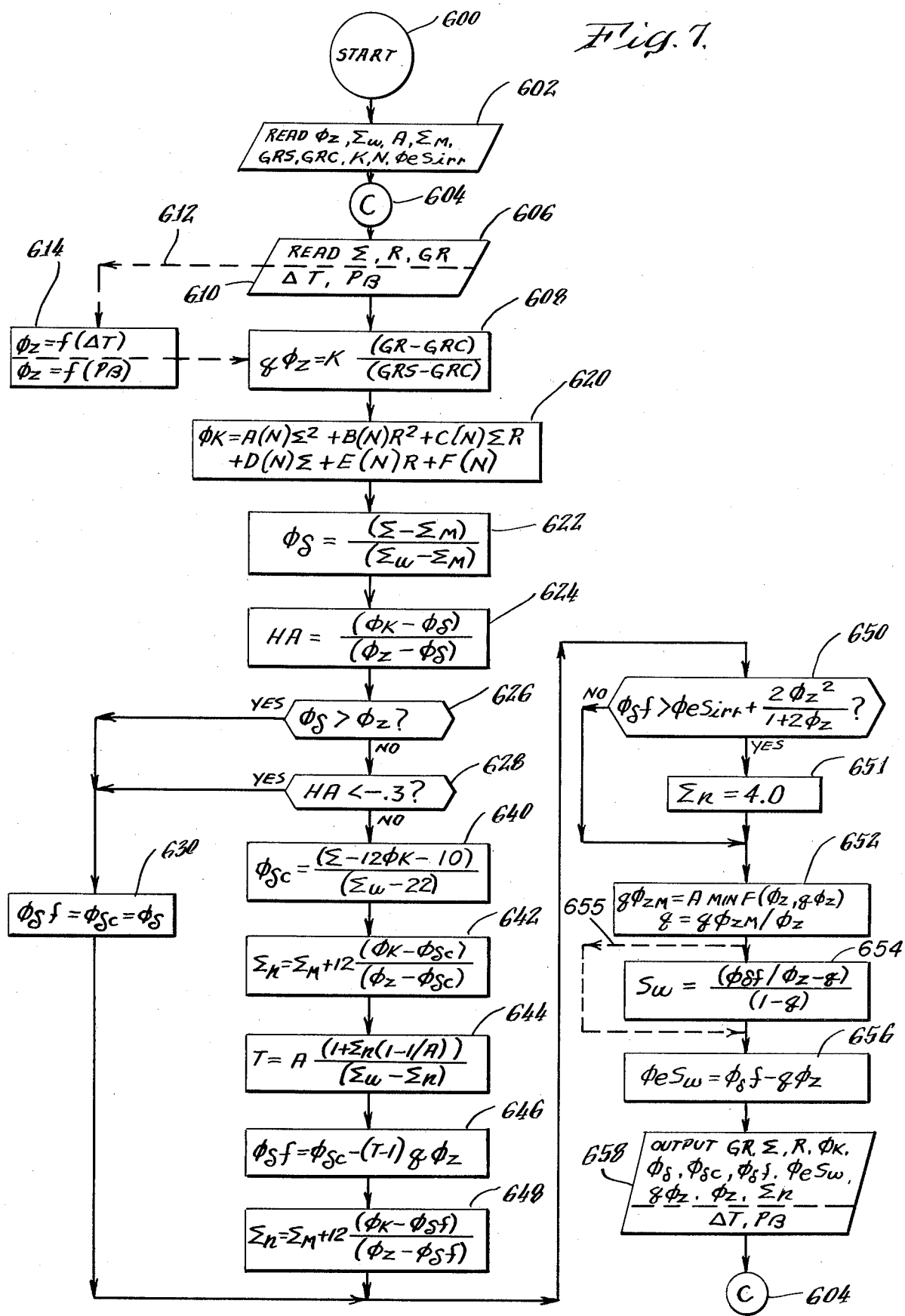
FIG. 7 shows in process flow diagram form the detailed steps and relationships comprising another form of practicing the techniques of the invention.

Referring now to FIG. 7, there will be described the detailed steps in a process that may be readily implemented by programming a general purpose digital computer or microprocessor or equivalent analog circuits to perform the illustrated steps. As illustrated, the values of certain constants used in this technique may be read in, as shown in block 602. These will be described in more detail as they are used. The first $\phi_z$ corresponds to the maximum total porosity expected in cleanest formations to be considered. $\Sigma_w$ may be determined by previously described techniques comprising the use of circuits shown in FIG. 3, the processes illustrated in FIG. 5 or the curves displayed in FIG. 6.

In more difficult cases, the process that will be described in regard to FIG. 9 may be employed to determine both $\Sigma_w$ and A input. For now, the value of A may be considered as 1.0 for the normal salt water formations (high $\Sigma_w$) and somewhat closer to 2.0 for fresh water ($\Sigma_w$ values approaching 30), as shown in FIG. 10. The input value of $\Sigma_M$ corresponds to the matrix if known, but like the value for M, may be assumed as 10. The constants GRS, GRC and K are related to gamma ray and have already been described. The indicator N will be used in regard to block 620 to designate the set of appropriate coefficients. The value $\phi_e$ $S_{irr}$ corresponds to the volume of irreducible water and generally is a value near 0.06 as will be described later.

Next in the process, as indicated in FIG. 7, the measurements are input as shown in block 606 with the reading of $\Sigma$, the ratio R and the gamma ray GR; and as indicated by optional block 610, measurements such as sonic $\Delta t$ and density Rho-B. If these latter measurements are available, the process may optionally continue as indicated by branch 612 to block 614 for the computation of $\phi_z$ as a function of either of these optional measurements using well known techniques. In this case, the value of $\phi_z$, otherwise provided as an input constant in block 602, is updated with each new depth.

Then, as indicated in block 608 of FIG. 7, the computation of $q\phi_z$ is performed using the illustrated relationship already described as EQ. (6). Next, but not necessarily in that order, block 620 illustrates the computation of $\phi_k$ using the set of coefficients designated by the indicator N, the input absorption characteristic $\Sigma$ and the hydrogen-dependent ratio R, as already described in regard to circuit 300 illustrated in FIG. 3. It should be understood that if $\phi_N$ is available, it may be input instead of R and used in place of $\phi_k$ so block 620 could be bypassed.

Since $\Sigma_w$ is known in this case, $\phi_\delta$ may be computed at this time as illustrated in block 622 by the already described relationship EQ.(5) indicated therein. This $\phi_\delta$ pore volume indication and the above $\phi_k$ or $\phi_N$ pore volume indications are the principal measurements utilized in this invention as already described. However, there will now be described some additional procedures which provide for additional compensation in the presence of hydrocarbons and clays which have different hydrogen and absorption characteristics than that initially assumed to derive $\phi_k$ and $\phi_\delta$. These compensated pore volume indicators provide information as to the type and producibility of the hydrocarbons.

Block 624 of FIG. 7 illustrates the computation of an apparent hydrogen index HA with the relationship:
$$HA = (\phi_k - \phi_\delta)/(\phi_z - \phi_\delta) \text{ EQ.} \quad (8).$$

This indicator is useful in determining, as illustrated for example in block 628, whether or not further corrections may be necessary. However, it is preferred to also check as indicated in block 626 if $\phi_\delta$ exceeds $\phi_z$. In this case, this test answers YES, indicating the formation is shale and contains no hydrocarbons. Similarly, if HA is less than −0.3, the test indicated in block 628 answers YES, and implies that $\phi_\delta$ excessively exceeds $\phi_k$ and indicates no hydrocarbons were present and no further compensation is necessary. Therefore, if either of these two tests answers YES, the process bypasses the blocks 640 through 648 and proceeds through block 630 where the value $\phi_\delta$ is assigned to equal two values not yet discussed, $\phi_{\delta c}$ and $\phi_{\delta f}$. At this point it suffices to say that this procedure merely causes $\phi_{\delta c}$ and $\phi_{\delta f}$ displays to coincide with that for $\phi_\delta$.

If both the tests illustrated in blocks 626 and 628 answer NO, hydrocarbons are indicated to be present. No further processing is essential but it is now possible to compensate $\phi_\delta$ for both the hydrocarbon and the clay neutron absorption characteristics if different from those assumed in the abovedescribed procedure. These compensations begin as illustrated with block 640 with the computation of $\phi_{\delta c}$ by combining $\Sigma, \phi_k$, certain constants and $\Sigma_w$ input as shown in block 602 as follows:

$$\phi_{\delta c} = (\Sigma - 12\phi_k - 10)/(\Sigma_w - 22) \text{ EQ.} \quad (9).$$

As previously stated, 10 corresponds to $\Sigma_M$. $\Sigma_w$ is as previously determined. The constants 12, 10 and 22 are illustrative. The value 22 corresponds to a $\Sigma$ value appropriate for what may be characterized as dead oil; i.e., hydrocarbons which have essentially been de-gassed. The value 12 will change accordingly if $\Sigma_{dead\,oil}$ or $\Sigma_M$ is different. Thus, $\phi_{\delta c}$ corresponds to compensating $\phi_\delta$ for hydrocarbons having a $\Sigma_h$ value different from that of the value $\Sigma_M$ assumed in the relationship shown in block 622. The basis for this compensation will be described in more detail later.

Next in FIG. 7 and as shown in block 642, an initial estimate of the actual $\Sigma$ value of the hydrocarbons may be made using the relationship shown therein:

$$\Sigma_n = \Sigma_M + 12(\phi_k - \phi_{\delta c})/(\phi_z - \phi_{\delta c}) \text{ EQ.} \quad (10).$$

It should be noted that constant 12 here, like in EQ. (9), is illustrative and would change as described above.

The above compensations are essentially complete for most cases; e.g., where formation waters are reasonably saline. This, as will be described in regard to FIG. 10, provides the compensation that the clays contained in the pores of the formation; i.e., those clays generally considered as dispersed and which have not undergone compression as part of the overburdened formation load supporting structure, generally have the same absorption characteristic as that of the formation water; i.e., $\Sigma_{clay} = \Sigma_w$. It has been observed, however, that this formation compensation might not apply to fresher formation waters where $\Sigma_{clay}$ may be somewhat greater than $\Sigma_w$. As will be described in regard to FIG. 10, it is possible, however, to estimate the ratio $A = \Sigma_{clay}/\Sigma_w$ from $\Sigma_w$ itself in many cases. Thus, the value of A may be input along with $\Sigma_w$ as illustrated in block 602 of FIG. 7. For most cases, A is near 1.0 and no corrections take place when A is applied as indicated in block 644 to compute a temporary parameter indicated here as T. This parameter will be discussed later in detail. As for now, it is convenient to merely use the expression:

$$T = A(1 + \Sigma_n(1-1/A))/(\Sigma_w - \Sigma_n) \text{ EQ.} \quad (11).$$

Now with the above attribute T for the clays determined, the final correction may be applied to previously computed $\phi_{\delta c}$ by subtracting $(T-1)q\phi_z$ to form $\phi_{\delta f}$ as indicated in block 646. Similarly, as indicated next in block 648 of FIG. 7, the final determination may be made for $\Sigma_n$ using the same relationship previously discussed in regard to block 642 and EQ.(10) but now employing $\phi_{\delta f}$ in place of $\phi_{\delta c}$.

From this point on, the process may continue in the same manner whether or not the hydrocarbons were indicated by the test shown in blocks 626 and 628. Thus, as shown in the next block 650, a test on $\phi_{\delta f}$ is made to determine the significance of the indicated hydrocarbons. Experience has shown that even though hydrocarbons may be indicated, they are not normally significant commercially unless the amount of water left after hydrocarbon saturation is reduced below a certain volume substantially equal to $\phi_e S_{irr} + 2\phi_z^2/(1 + 2\phi_z)$. $\phi_e S_{irr}$ is input and usually is about $0.06 \pm 0.015$. $\phi_z$ is either input of determined as in block 614. The test indicated in block 650 answers YES if $\phi_{\delta f}$ is not reduced below this volume and $\Sigma_h$ is set to an artificially low value, here 4.0 as shown in block 651, to prevent indicating producible hydrocarbons by otherwise displaying the $\Sigma_h$ indication computed as shown in block 648. It should be understood that economic conditions may change and production of significant amounts of water along with the hydrocarbons become commercially practical. In this case, this test could be adjusted accordingly, as by increasing the $\phi_e S_{irr}$ input value, for example.

Several additional measurements useful in evaluating hydrocarbons production may be obtained from the preceding measurements. After initially selecting the minimum value between $\phi_z$ and $q\phi_z$ as $q\phi_{zM}$, as shown in block 652 of FIG. 7, it may be employed to separate $q$ from $\phi_z$. As shown in optional block 654, the saturation value for water $S_w$ may be computed using a relationship with this $q$ and $\phi_{\delta f}$ previously derived as, for example, in block 646. The preferred relationship is $$S_w = (\phi_{\delta f}/\phi_z - q)/(1 - q) \quad \text{EQ.} \tag{12}$$

This step may be omitted as shown by branch 655. The effective porosity $\phi_e$ and a bulk pore volume indicator $\phi_e S_w$ may be computed using $\phi_z - q\phi_z$, or the relationship shown in block 656; $\phi_e S_w = \phi_{\delta f} - q\phi_z$.

Finally, as shown in block 658, all or any of the above input or computed measurements may be output for display. It is understood, of course, that the essential measurements are $\phi_k$ (or $\phi_N$) and $\phi_\delta$ which, by their difference, indicate the presence of hydrocarbons, whereas $\phi_{\delta c}$, $\phi_{\delta f}$ and $\Sigma_h$ provide additional confirmation both as to the presence, producibility and the nature of these hydrocarbons. Measurements such as the gamma ray or $q\phi_z$ aid in assessing the importance of these hydrocarbon indications, since they relate to cleanliness and producibility of the formation.

The process may continue then as indicated in FIG. 7 by returning to point C as indicated at 604, for another set of measurements at a different depth. In this manner a continuous display of these measurements may be obtained and recorded on conventional display devices normally found associated with digital computers such as X-Y plotters or electrostatic printerplotters.

FIG. 8 illustrates such a display wherein variations in line codes and weights as well as shading employed between certain lines enhances the clarity of the display. Midway in the figure is shown the typical relationship between the various porosities; i.e., $\phi$ measurements, expected in the presence of hydrocarbons, when derived, for example, as illustrated by the process of FIG. 7. Again, by convention, porosities increase from right to left. Consequently, the $\phi_N$ or $\phi_k$ curve, depending upon the type of neutron log used to derive this hydrogendependent pore volume indicator, displays the maximum or leftmost porosity in hydrocarbon zones. Next, to the right of this indicator is $\phi_\delta$, the absorption-dependent pore volume indicator. Then progressively to the right thereof, are the auxiliary curves, $\phi_{\delta c}$, $\phi_{\delta f}$ and $\phi_e S_w$. On the left-hand side of the display, the $q\phi_z$ and $\Sigma_h$ curves are shown.

The central zone shown in FIG. 8 is found to have a porosity of 32–38% from the $\phi_N$ curve. From the large difference between $\phi_N$ and $\phi_\delta$ curves, hydrocarbons are indicated to be present. The $\Sigma_h$ curve indicates the hydrocarbon type is a high viscosity, heavy oil. The $\phi_{\delta c}$ curve compensates $\phi_\delta$ for this difference in $\Sigma_h$ and the $\phi_{\delta f}$ curve adds further compensation for clays. Note that there would not have been the difference shown between $\phi_{\delta c}$ and $\phi_{\delta f}$ if A = 1.0.

By subtracting $q\phi_z$ from $\phi_{\delta f}$ (as shown in block 656 of FIG. 7), $\phi_e S_w$ is obtained, which is directly comparable with $\phi_e S_{irr}$, as shown by the vertical dash line on FIG. 8. When $\phi_e S_w$ approaches $\phi_e S_{irr}$, $S_w$ approaches the irreducible water saturation for the reservoir and indicates water-free production may be expected. This particular zone approaches this desirable condition only at the topmost interval.

Now that the operative steps of the technique have been described, more of the underlying principles will be provided. It is now understood that the simple, though effective, EQ.(5) relation for the absorption-dependent pore volume indicator $\phi_\delta$, particularly in the form of $$\phi_\delta = (\Sigma - 10)/(\Sigma_w - 10) \quad \text{EQ.} \tag{5A}$$

takes advantage of the compensation provided by $\Sigma_M = \Sigma_h = 10$ and $\Sigma_w = \Sigma_{clay}$. This compensation requires only that $\Sigma_w$ be determined in advance. This advantage will be further appreciated when a more complete relation is given:

$$\Sigma_{log} = \underbrace{(1 - \phi_z)\Sigma_{ma}}_{\text{(matrix)}} + \underbrace{\phi_e S_w \Sigma_w}_{\text{(water)}} + \underbrace{q\phi_z \Sigma_{clay}}_{\text{(clay)}} + \underbrace{(1 - S_w)\phi_e \Sigma_n}_{\text{(hydrocarbon)}} \quad \text{EQ.(13).}$$

As denoted above, the four terms to the right of the equal sign are respectively, the matrix, water, clay, and hydrocarbon contributions to $\Sigma$ or $\Sigma_{log}$.

By relating $\Sigma_{clay}$ to $\Sigma_w$ through $A = \Sigma_{clay}/\Sigma_w$ and considering the clays as dispersed in the pore volume with the water, the above water and clay terms may be combined as $\Sigma_w(\phi_e S_w = Aq\phi_z)$ and EQ. (13) may be manipulated into the form:

$$\phi_e S_w + q\phi_z A \left[ 1 + \Sigma_n \frac{(1 - \frac{1}{A})}{\Sigma_w - \Sigma_n} \right] = \frac{\Sigma_{log} - \Sigma_{ma}}{\Sigma_w - \Sigma_n} - \phi_z \frac{(\Sigma_n - \Sigma_{ma})}{\Sigma_w - \Sigma_n} \quad \text{EQ.(14).}$$

The second term may be rewritten using T from EQ. (11) already described to form $q\phi_z[T]$ and the left side of the equation becomes $\phi_e S_w = q\phi_z T$. The right side might be rewritten as $$\frac{\Sigma_{log} - \Sigma_{ma} - \phi_z(\Sigma_n - \Sigma_{ma})}{(\Sigma_w - \Sigma_n)}.$$

By assuming, rather than $\Sigma_h = 10$, which is appropriate for gas, a $\Sigma_h$ appropriate for dead oil (here 22, for example) and using $\phi_k$ for $\phi_z$ as a first approximation, the above provides $\phi_{\delta c}$ as EQ.(9). An approximation of $\Sigma_h$ may be obtained using the apparent hydrogen index obtained from EQ.(8) and interpolating between the $\Sigma_h$ assumed for gas and dead oil; i.e., between 10 and 22, respectively, which have corresponding HA values of 0.0 and 1.0. The linear relationship $\Sigma_h = 10 + 12HA$ may be used and becomes EQ.(10), when taken with EQ.(8) and $\phi_{\delta c}$ is used in place of $\phi_\delta$.

A further improvement in the porosity evaluation may be found be returning to the left side of EQ.(14) but now with a value of T (from A) as provided from EQ.(11). When this is applied as a correction to $\phi_{\delta c}$, a final value $\phi_{\delta f}$ is obtained. This improved value may in turn be used in place of $\phi_{\delta c}$ in EQ. (10) to still further improve $\Sigma_h$.

In the above process, only $\phi_z$, $\Sigma_w$ and A need be determined. As previously discussed, $\phi_z$ may be obtained from sonic or density logs or, in many cases, estimated from local knowledge or from the maximum $\phi_N$ value obtained in clean, non-hydrocarbon bearing beds as found during PASS I.

Determination of $\Sigma_w$ may be made as previously discussed when a known, reasonably clean and porous non-hydrocarbon bearing bed is available. Here, $\Sigma_w$ is adjusted until $\phi_\delta$ equals $\phi_N$ (or $\phi_k$) as described in regard to FIG. 3. Where no such beds are known, they may be located through the use of the "RECON" curve derived as shown by circuit 440 in FIG. 4 or by the PASS I procedure illustrated in FIG. 5. Another approach is illustrated in FIG. 9 which will now be discussed.

While crossplots of $\Sigma_{log}$ versus porosity or resistivity are well known for clean formations, a crossplot of $\Sigma_{wa}$, from EQ.(4), versus q from EQ.(6) has been found useful in determining $\Sigma_w$ and A in shaly formations. As discussed in regard to block 652 in FIG. 7, q may be derived from $q\phi_z$ if $\phi_z$ is known, as from the sonic or density logs as shown at block 614. If $\phi_z$ is not available, $\phi_N$ or $\phi_k$ may be used. The resulting plot is illustrated in FIG. 9. Typically, the points plot in a wedge shaped pattern narrowing to the left. An upper limit line becomes defined by the uppermost trend points over a range of q values. This line is denoted "A"LINE-MAX on FIG. 9. A similar limit line is defined by the lowermost trend points and is denoted "A"LINE-MIN. Between these lines are bands of equal $\Sigma$ or $\Sigma_{log}$ values, all generally converging toward and thus defining a common point on the $\Sigma_{wa}$ axis at $q = 0$. Such a point is shown at Point 900 in FIG. 9 and defines $\Sigma_w$ as the $\Sigma_{wa}$ value at this point.

In addition to determining $\Sigma_w$, this plot may also be applied to determine A. Returning to EQ.(13) above, and assuming $\Sigma_{ma} = 10$ and $S_w = 1$, as was done in EQ.(5A), since this will be the form in which $\Sigma_w$ will be employed, the equation takes the following form $$\Sigma_{log} - 10 = -10\phi_z + \Sigma_w(\phi_e + Aq\phi_z) \quad \text{EQ. (15A).}$$

Figure 9:
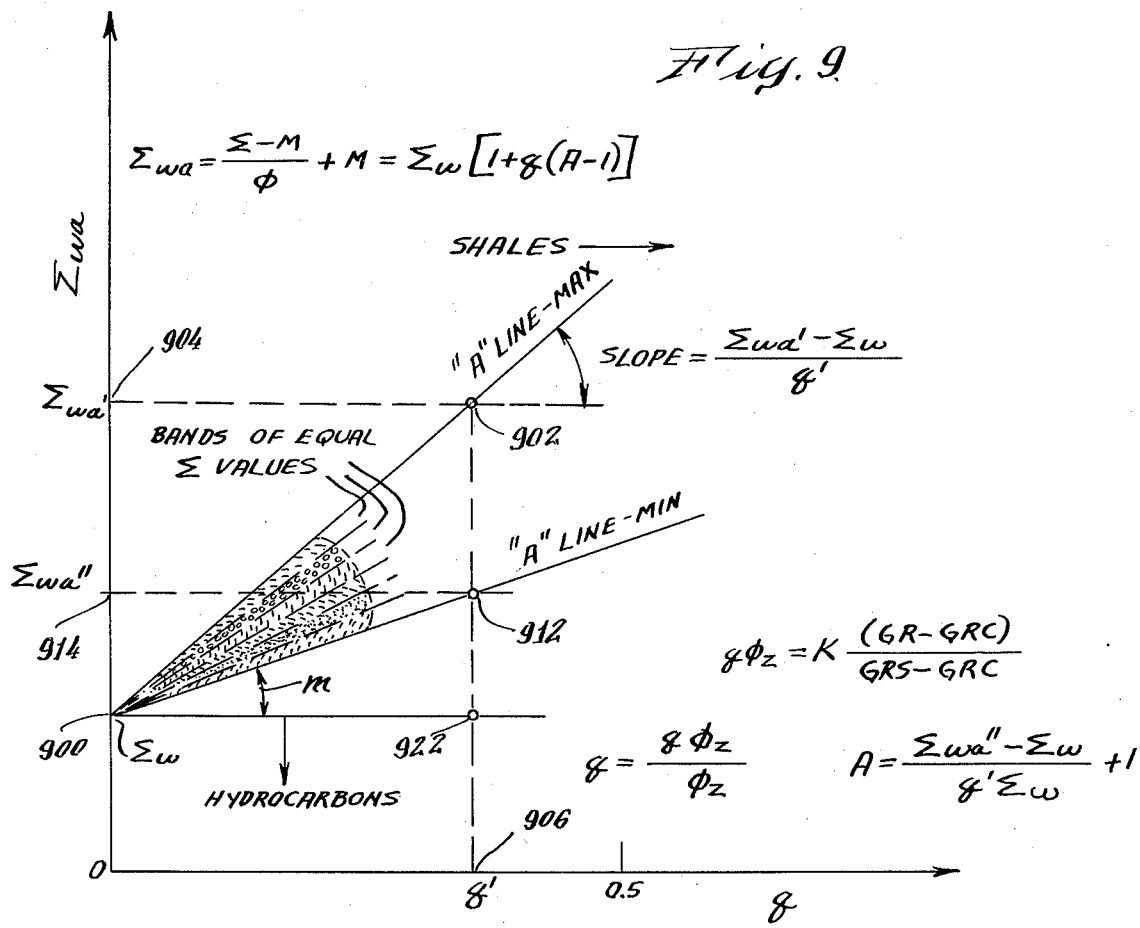
FIG. 9 illustrates certain physical relationships between measured and determined values utilized in the invention.
Figure 10:
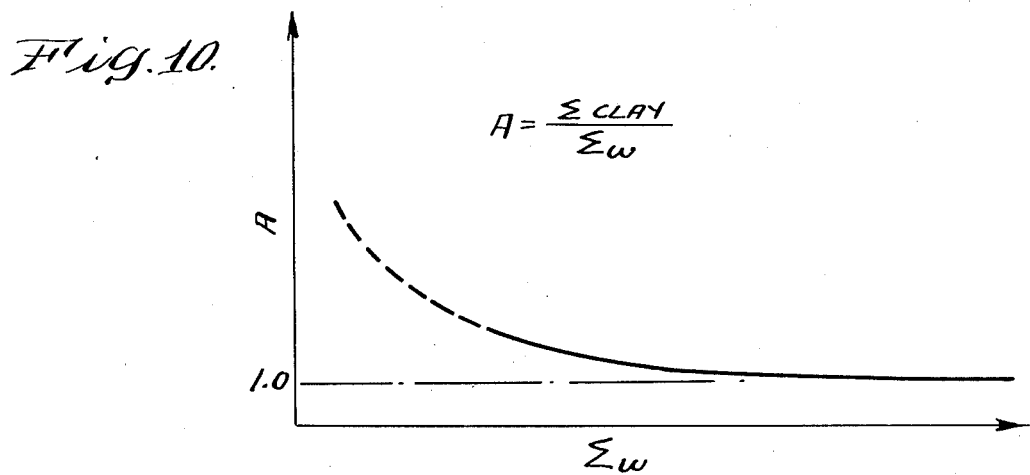
FIG. 10 illustrates a general relation between thermal neutron absorption characteristics of the formation water and the associated clays.

For the points near the uppermost trend line illustrated in FIG. 9; i.e., clean to slightly shaly water-bearing formations, it can further be assumed that $\phi_e = \phi_z - q\phi_z$ and the above becomes $$\Sigma_{log} - 10 = \phi_z(\Sigma_w - 10 - q\Sigma_w + A\Sigma_w q) \quad \text{EQ. (15B).}$$

Since plotting versus q and $\Sigma_{wa}$ removes the very shaly and hydrocarbon bearing points from this group of points, it can be further assumed that $\phi_z = \phi_N$ or $\phi_k$ and the above equation rearranged to form $$\frac{\Sigma_{log} - 10}{\phi_N} + 10 = \Sigma_w[1 + q(A - 1)] \quad \text{EQ.(16).}$$

The left-hand side of EQ.(16) is the same as EQ.(4) when M = 10 and defines $\Sigma_w$ which here is understood to be $\Sigma_{wa}$. For points falling along one of the trend lines EQ.(16) becomes:

$$\Sigma_{wa} = \Sigma_w[1 + q(A - 1)] \quad \text{EQ.(17).}$$

The slope of a trend line, as may be determined between the $\Sigma_w$ point at 900 in FIG. 9 and another point on this line, as for example, $(\Sigma_{wa'}, q')$ point at 902, is $$\frac{\Sigma_{wa'} - \Sigma_w}{q'} = \Sigma_w(A - 1) \quad \text{EQ.(18),}$$

from which A is derived as $$A = \frac{\Sigma_{wa'} - \Sigma_w}{q'\Sigma_w} + 1 \quad \text{EQ.(19).}$$

As illustrated in FIG. 9, each trend line denotes a different "A" value with the maximum and minimum values being the upper and lower trend lines, respectively. It is preferred to use the lower or minimum slope line, shown as m in FIG. 9, to define A, as this line more closely represents the dispersed clays for which A was intended.

Another method of determining A is appropriate when $\Sigma_w$ is already determined. It has been discovered that there is a relationship as previously discussed between A and $\Sigma_w$ such that at high salinities or high $\Sigma_w$ values at or above 75, A = 1. Below $\Sigma_w = 75$, as illustrated in FIG. 10, A gradually increases. For example, A may become 1.2 at $\Sigma_w = 65$, 1.4 at 50, 1.7 at 37 and 2.0 at 27, respectively, for a given area.

Figure 11A:
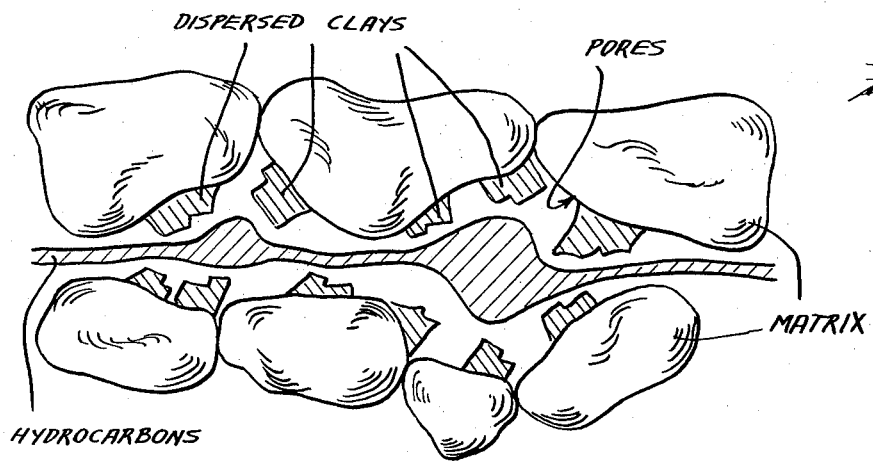
FIG. 11A shows a formation model useful in illustrating the certain aspects of the invention when dispersed clays are present.
Figure 11B:
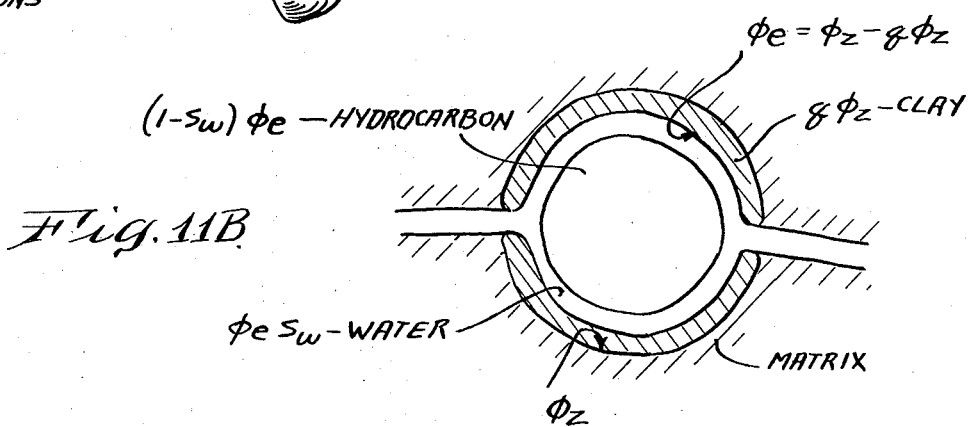
FIG. 11B shows a simplified volumetric relationship corresponding to certain terms used in illustrating the invention.

FIGS. 11A and 11B illustrate the effect of clays or shales in the formation. A cross-section of a porous shaly sand containing water and hydrocarbons is shown. If the clays occur as part of the matrix, they must support the stress produced by the weight of the overlying formations and in doing so, become compressed or squeezed, particularly as the formation undergoes compaction over long periods of time and with deeper and deeper burial. The original nature of the clays changes substantially as the fluids originally held within the clay are squeezed out and the density of the clays increases. In general, these clays become more like the sand matrix grains, particularly as to their effects on the response of both hydrogen and absorption dependent neutron logging measurements. Thus, clays which are part of the structural matrix consequently undergo changes in geologic time which cause them to look to these log measurements very much like the sand grains.

However, clays which are dispersed within the intergranular pores between the sand grains, as shown in FIG. 11A are not changed substantially, since they do not structurally support the formation. They remain essentially in equilibrium with the formation water and affect the absorption dependent neutron log measurements very much like the water; i.e., $\Sigma_{clay}$ approximately equals $\Sigma_w$. Thus, clays which are not part of the structural matrix but are dispersed within the pores look to these log measurements very much like the formation water.

When the volume of dispersed clays increases to the point where a substantial part of the pore space, as shown in FIG. 11A, becomes clay-filled; besides the decrease in the volume potential for hydrocarbons; i.e., the effective porosity, an even more important effect takes place. The clays begin to plug the interconnecting passages between the pores and the producibility of the hydrocarbons declines substantially. In contrast, comparatively large volumes of clay can be present in the matrix without this loss of producibility. Thus, it is important to utilize measurements which are responsive to dispersed clays in evaluating the producibility of reservoirs as is done in the techniques of this invention.

It is also important to relate the volume of the clays to the pore volume itself, since the given volume of clay would reduce producibility less when dispersed in a large pore as compared to a small pore. The maximum volume of dispersed clay which still permits economical production, as previously described, is given by $2\phi_{z2}/(1+2\phi_z)$ and may be regarded as $q\phi_z$MAX. Similarly, the volume of formation water is meaningful only when considered with the actual pore volume and the associated irreducible water volume.

FIG. 11B illustrates the volumetric relationships used herein for the total intergranular pore volume $\phi_z$, the volume of the dispersed clay $q\phi_z$, the remaining effective porosity $\phi_e$, that part of $\phi_e$ filled with water $\phi_e S_w$, and that part filled with hydrocarbons $(1-S_w)\phi_e$.

Recalling the discussion of the steps illustrated in FIG. 7 and the associated curves displayed in FIG. 8, it will be now understood that $\phi_N$ indicates $\phi_z$ when $q\phi_z$ is small, $\phi_\delta$ indicates $\phi_e S_w + q\phi_z$ when $\Sigma_h$ equals $\Sigma_{ma}$ and $\Sigma_{clay}$ equals $\Sigma_w$; $\phi_{\delta c}$ is $\phi_\delta$ compensated for $\Sigma_h$ different from $\Sigma_{ma}$ and $\phi_{\delta f}$ provides still further compensation for $\Sigma_{clay}$ not equal to $\Sigma_w$, if needed, so that $\phi_{\delta f}$ essentially corresponds to the total of the volumes for the formation water $\phi_e S_w$ and for the dispersed clay $q\phi_z$. These volumes are readily separable to provide both $\phi_e S_w$ and $q\phi_z$. Thus, the pore volume fractions illustrated in FIGS. 11A and 11B are directly indicated in FIG. 8 in a readily comparable manner. The volume of irreducible water, $\phi_e S_{irr}$ may also be included for comparison.

Figure 12:
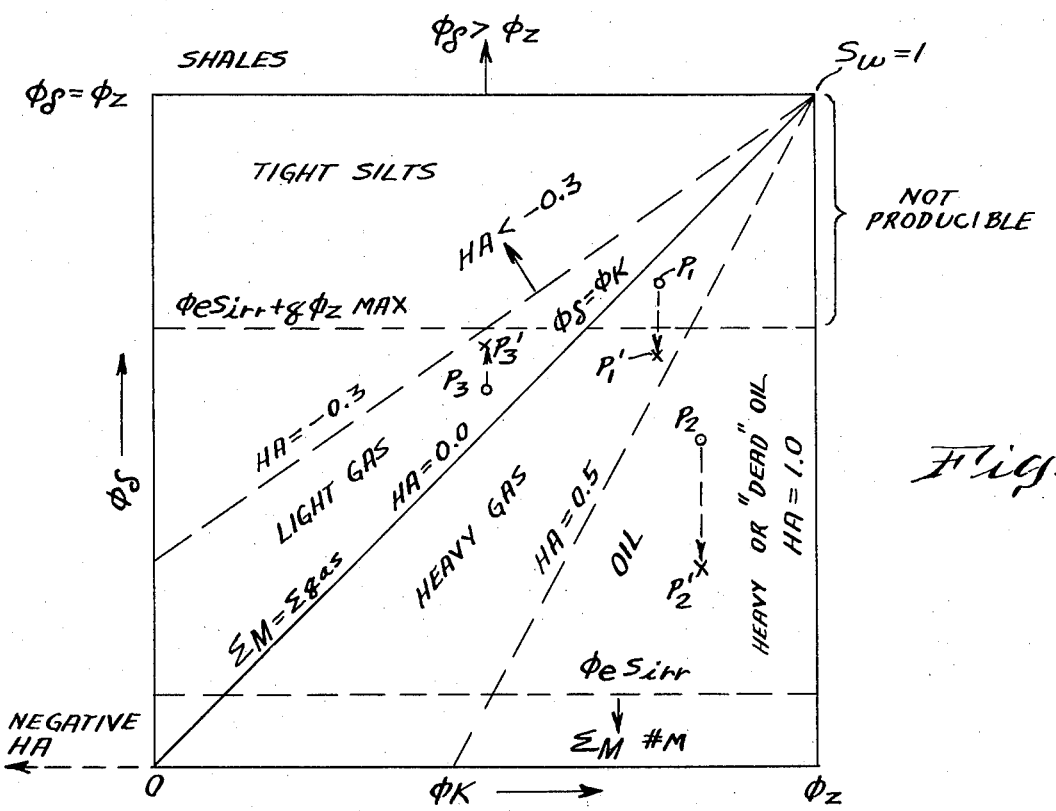
FIG. 12 graphically shows the relationships between measurements produced in accordance with the invention and the indicated formation condition.

Referring now to FIG. 12, there is shown the pore volume indications produced in accordance with this invention in still another form. Here, a cross-plot of $\phi_\delta$ with $\phi_k$ (or $\phi_N$) is shown in relation to $\phi_z$ and the other pore volume indications discussed above in regard to FIGS. 11A and 11B and produced as described in regard to FIGS. 4, 5 or 7. Where $\phi_\delta$ equals $\phi_k$, as is the case illustrated along the diagonal line bisecting FIG. 12, the indication is that the absorption characteristics of any hydrocarbons present are essentially as initially assumed; i.e., $\Sigma_h$ equals $\Sigma_{ma}$ (or $\Sigma_M = \Sigma_h = 10$). Since this causes the numerator of EQ.(8) to become zero, HA also becomes zero which corresponds to $\Sigma_h = 10$ and indicates that the hydrocarbon present is gas.

The amount of gas present will be indicated by the distance from the upper right-hand corner of FIG. 12 corresponding to $\phi_\delta = \phi_k = \phi_z$ or $S_w = 1$. Since the presence of gas removes both the hydrogen and chlorine that would have been present in the displaced formation water, both $\phi_\delta$ and $\phi_k$ will be low and different from $\phi_z$, indicating the gas saturation. If both are reduced below that level represented by the $\phi_e S_{irr} = q\phi_z$MAX as shown in FIG. 12, the gas is indicated to be producible.

By way of further example, consider the case where $\Sigma = 22.8$, $\Sigma_w = 82$ (thus A = 1), $\phi_z = 0.35$ and $\phi_k = 0.18$. From EQ.(5) and using M = 10, $$\phi_\delta = \frac{22.8 - 10}{82 - 10} = \frac{12.8}{72} = 0.178,$$

nearly equal to $\phi_k$ and thus near the $\phi_k = \phi_\delta$ line. Proceeding as shown in FIG. 7, HA can be derived as shown in block 624 and becomes:

$$HA = \frac{0.18 - .178}{.35 - .178} = \frac{0.002}{0.172} = \text{approximaely } 0.0.$$

Since $\phi_\delta$ is less than $\phi_z$ and HA is greater than $-0.3$, $\phi_{\delta c}$ is derived as shown in block 640:

$$\phi_{\delta c} = \frac{22.8 - 12(.18) - 10}{82 - 22} = \frac{10.6}{60} = 0.177,$$

or essentially, $\phi_\delta = \phi_{\delta c}$.

$\Sigma_h$ is derived as shown in block 642 of FIG. 7:

$$\Sigma_h = 10 + 12 \frac{(.18 - .177)}{(-.35 - .177)} = 10 + 12 \frac{(.003)}{(.173)},$$

or 10, or essentially, $\Sigma_M$. Similarly, the compensation for $\phi_{\delta c}$ to $\phi_{\delta f}$ is small and $\Sigma_h$ remains at 10. Thus, the test shown at block 650 of FIG. 7 corresponds to determining whether this case falls above or below the "NOT PRODUCIBLE" limit shown in FIG. 12 as a line designated $\phi_e S_{irr} = q\phi_z$MAX. In this particular case, the value for this line is slightly below 0.21 and since $\phi_{\delta f}$ falls below this value, it indicates that the hydrocarbon is producible and $\Sigma_h$ is left at 10 to permit its display. If $\phi_{\delta f}$ had exceeded 0.21 or plotted above the corresponding line of FIG. 12, the test indicated in block 650 of FIG. 7 would answer YES and $\Sigma_h$ would be set to 4 as shown in block 651, or to zero perhaps; but nevertheless, to a value which does not permit $\Sigma_h$ to be displayed, since such display would indicate the hydrocarbon is producible.

Points $P_1$ through $P_3$ shown in FIG. 12 illustrate the nature and degree of the $\phi_\delta$ compensation provided when $\phi_\delta$ is not equal to $\phi_k$. $P_1$, for example, initially plots just below the line and is first indicated to be "NOT PRODUCIBLE". However, HA and $\Sigma_h$ are found to be higher than assumed for gas, so $\phi_{\delta c}$ and $\phi_{\delta f}$ are progressively decreased as indicated by the dashed line from $P_1$ to $P_1'$, and the position of $P_1'$ is now indicated to be producible.

Point $P_2$ plots well below the $\Sigma_M = \Sigma_{gas}$ line, indicating heavy hydrocarbons; i.e., $\Sigma_h$ well above 10, and as a result, receives a relatively large compensation from $\phi_\delta$ at $P_2$ to $\phi_{\delta f}$ at $P_2'$. While not illustrated, it is possible to have such compensation result in a $\phi_{\delta f}$ less than $\phi_e S_{irr}$ as shown by the lower limit line in FIG. 12. This, of course, is impossible and indicates that perhaps the lithology is such that $\Sigma_M$ no longer is as assumed; i.e., near the $\Sigma_{gas} = 10$ value assumed. In this case, a different M value, as perhaps M = 8, if appropriate, could be assumed and the measurements reprocessed. Similarly, very high $\Sigma_h$ values may correspond to a low $\Sigma_h$ fluid invasion into the formation, as for example, fresh drilling fluid or flood waters.

Point $P_3$ in FIG. 12 plots above the $\phi_{67} = \phi_k$ line and corresponds to a negative HA index. This is sometimes attributed to a so-called excavation effect. In any case, very light (dry) gas is indicated. Compensation now increases the $\phi_\delta$ derived pore volume indications as shown by the dashed line moving upward from $P_3$ to $P_3'$. Points falling above the HA $< -0.3$ line are not compensated as indicated by the test shown in block 628 of FIG. 7 answering YES. Points above the $\phi_\delta > \phi_z$ line are similarly left uncompensated. Generally these points correspond to formation with clay volumes exceeding the intergranular pore volume such as tight silts and shales which thereby prohibits them from becoming effective reservoirs.

From the above description, it will now be appreciated why clays that are dispersed in the pore space of a formation are more important in determining the producibility of hydrocarbons than are the structural clays. By recognizing that these dispersed clays appear to the neutron measurements more like the formation water than the matrix or hydrocarbons, certain types of these measurements may be advantageously combined to provide compensation for the presence of these clays. By taking advantage of the difference in the neutron measurement responses in accordance with the type of measurement; e.g., hydrogen versus absorption dependence, compensation for clay volumes approaching that of the pore volume may be applied to more accurately determine the volume of hydrocarbons present and provide better indications of the producibility of these hydrocarbons.

By recognizing that different types of hydrocarbons produce different measurement responses on each type of neutron measurement, a simplifying assumption is advantageously applied to one of these measurements which allows comparison of the neutron measurements to determine not only the presence of hydrocarbons but also the type of hydrocarbon. With additional information from other measurements or locally applicable values, compensation may be applied for hydrocarbon types found to be different from that assumed to provide more accurate indications. The ability to indicate the hydrocarbon type as it exists in the formation under the very conditions which will control its production is an important advantage. For example, even if samples of the hydrocarbons can be obtained, the changes in temperature, pressure, or dissolved gasses that occur during and after sampling may alter the samples' characteristics.

The technique employs measurements which can be combined on the same tool and therefore obtained on the same trip through the borehole. This provides further compensation for measurement environment problems as, for example, changes in borehole fluids, tool position, source strength and depth references which may occur between measurements made on separate passes with separate tools.

Further, the simultaneous measurements employed herein may be combined at the time of measurement by adjusting the apparatus provided herein to obtain certain indications under known conditions. The adjusted apparatus may be then applied over the borehole intervals of interest to provide the desired indications. Since this adjustment may be performed in a reasonably clean and porous non-hydrocarbon-bearing formation and may be derived from the same measurements, borehole instrumentation and environments just prior to the measurements used to produce the pore volume indications, compensation for many common factors is provided which extends the range of application for the technique into formations which are more shaly, have less porosity or fresher formation waters than prior techniques.

Still further, since the apparatus may be used to obtain measurements through the casing of boreholes already drilled, techniques disclosed herein may be applied to evaluate formations previously overlooked in past production and evaluate formations under past and current production as well as formations penetrated by new boreholes.

While apparatus for performing the techniques disclosed herein have been described in various forms, it should be understood that still other forms may be used. For example, part or all of the signal processing may be done downhole or at the earth's surface, using either analog or digital components. Further, the signal processing may be done all or part in parallel or in serial sequences on signals or measurements recorded at one time and processed at another time or even another location.

The above described embodiments are, therefore, intended to be merely exemplary and all such variations and modifications are intended to be included within the scope of the invention as defined in the appended claims.

What is claimed is:

1. A machine method of automatically indicating the presence of hydrocarbons in subsurface earth formations traversed by a borehole, comprising:
    (a) operating a neutron source for a predetermined time period;
    (b) operating a plurality of detectors differently spaced from said source to produce neutron-dependent responses during predetermined times relative to the operation of said source;
    (c) combining at least some of said responses to produce a first pore volume indication which is primarily dependent upon the hydrogen content of the fluid in the pore space of a formation adjacent said detectors;
    (d) combining at least some of said responses to produce a function representative of a thermal neutron absorption characteristic of said formation; and
    (e) combining the absorption characteristic function of said formation with a predetermined absorption characteristic for the water component of said formation to produce a second pore volume indication which is uncompensated for differences between the thermal neutron absorption characteristics of the matrix and any hydrocarbons present in the formation such that the presence of hydrocarbons is indicated by differences between said produced first and second pore volume indications.

2. The method of claim 1 and further including the step of displaying said produced first and second pore volume indications in a comparable manner.

3. The method of claim 1 wherein said predetermined time periods are adjusted as a function of said thermal neutron absorption characteristic of said formation.

4. A machine method of automatically indicating the presence of hydrocarbons in subsurface earth formations traversed by a borehole, comprising:
    (a) producing a first pore volume indication which is primarily dependent upon the hydrogen content of the fluid in the pore space of a formation;
    (b) producing a function representative of a thermal neutron absorption characteristic of said formation; and
    (c) combining the absorption characteristic function of said formation with a predetermined absorption characteristic for the water component of the formation to produce a second pore volume indication which is uncompensated for the thermal neutron absorption characteristic of at least one component of the formation such that the presence of hydrocarbons is indicated by differences between said produced first and second pore volume indications.

5. The method of claim 4 and further including the step of displaying said produced first and second pore volume indications in a comparable manner.

6. The method of claim 5 wherein said first pore volume indication is derived from measurements substantially compensated for any thermal neutron absorption effects of the formation.

7. The method of claim 6 wherein said measurements are obtained from at least two detectors located at different spacings from a neutron source and are representative of the neutron populations in the formation adjacent to said detectors.

8. The method of claim 7 wherein the detectors used to obtain the measurements from which the first pore volume indicator is derived are substantially responsive to only epithermal neutron populations and therefore to the slowing down of high energy neutrons by the hydrogen in the formation and substantially unresponsive to thermal neutron absorption characteristics of said formation and borehole.

9. The method of claim 7 wherein said neutron source is pulsed and said detectors are gated relative to said pulse to begin the measurements after a substantial portion of the neutron population of said borehole adjacent to said detectors has decayed thereby minimizing borehole effects in their measurements, said detectors also gated relative to said pulse to perform the measurements before a substantial portion of the neutron population in the formation adjacent said detectors has decayed below detection levels.

10. The method of claim 9 wherein the gating of the detectors is dependent upon a decay time measurement at one of said detectors.

11. The method of claim 10 wherein said decay time measurement is utilized to compensate said first pore volume indication for thermal neutron absorption effects of said formation.

12. The method of claim 11 wherein said decay time measurement corresponds to said function representative of a thermal neutron absorption characteristic of said formation.

13. A machine method of automatically indicating the presence of hydrocarbons in subsurface earth formations traversed by a borehole, comprising:
(a) producing a measurement which is primarily dependent upon the hydrogen content of the fluid in the pore space of a formation;
(b) producing a function representative of a thermal neutron absorption characteristic of said formation;
(c) combining the absorption characteristic function with the hydrogen-dependent measurement to provide apparent absorption characteristics for the water component of said formation; and
(d) combining the absorption characteristic function with other characteristics of the formation to provide a function for recognizing the proper formation for determining a representative absorption characteristic for the water component of said function.

14. The method of claim 13 and further including combining the representative absorption characteristic for the water component of the formation determined in the proper formation with the function representative of the absorption characteristic of subsurface earth formations to produce a second pore volume indication which is uncompensated for differences in the thermal neutron absorption characteristics of hydrocarbons present in the pore space of the formations such that the pressure of hydrocarbons is indicated by differences between said produced first and second pore volume indications.

15. The method of claim 14 and further including the step of displaying said produced first and second pore volume indications in a comparable manner.

16. A machine method of automatically indicating the presence of hydrocarbons in subsurface earth formations traversed by a borehole, comprising:
producing a first pore volume indication which is primarily dependent upon the hydrogen content of the fluid in the pore space of a formation;
producing a function representative of a thermal neutron absorption characteristic of said formation; and
combining the absorption characteristic function of said formation with a predetermined absorption characteristic for the water component of the formation to produce a second pore volume indication which assumes there are no substantial differences between the thermal neutron absorption characteristics of the formation matrix and any hydrocarbons present in the pore space in the formation such that the presence of hydrocarbons with thermal neutron absorption characteristics different from the matrix is indicated by differences between said produced first and second pore volume indications.

17. The method of claim 16 and further including the step of compensating the second pore volume indication as a function of the thermal neutron absorption characteristic of the hydrocarbon present as indicated by the difference between said first and second pore volume indications.

18. The method of claim 17 and further including the steps of producing a third pore volume indication representative of the total porosity and combining said produced pore volume indications to produce an indication of the thermal neutron absorption characteristic for the hydrocarbon which is related to the viscosity and thereby producibility of the hydrocarbon as present in the formation.

19. The method of claim 18 and further including the step of compensating the second pore volume indication as a function of the produced indications of the thermal neutron absorption characteristic for the hydrocarbon present in the formation.

20. The method of claim 19 wherein said compensation of the second pore volume indication includes compensation for differences between the thermal neutron absorption characteristics of the formation water and the clays present in the formation.

21. Apparatus for indicating the presence of hydrocarbons in subsurface earth formations traversed by a borehole, comprising:
means for producing a first pore volume indication which is primarily dependent upon the hydrogen content of the fluid in the pore space of a formation;
means for producing a function representative of a thermal neutron absorption characteristic of said formation; and
means for combining the absorption characteristic function of said formation with a predetermined absorption characteristic for the water component of the formation to produce a second pore volume indication which is uncompensated for differences between the thermal neutron absorption characteristics of the matrix and any hydrocarbons present in the pore space in the formation such that the presence of hydrocarbons is indicated by differences between said produced first and second pore volume indications.

22. Apparatus for indicating the presence of hydrocarbons in subsurface earth formations traversed by a borehole, comprising:
means for operating a neutron source for a predetermined time period;
means for operating a plurality of detectors differently spaced from said source to produce neutron-dependent responses during predetermined times relative to the operation of said source;
means for combining at least some of said responses to produce a first pore volume indication which is primarily dependent upon the hydrogen content of the fluid in the pore space of a formation adjacent to said detectors;
means for combining at least some of said responses to produce a function representative of a thermal neutron absorption characteristic of said formation; and
means for combining the absorption characteristic function of said formation with a predetermined absorption characteristic for the water component of said formation to produce a second pore volume indication which is uncompensated for differences between the thermal neutron absorption characteristics of the matrix and any hydrocarbons present in the formation such that the presence of hydrocarbons is indicated by differences between said produced first and second pore volume indications.

23. A machine method of automatically indicating the presence of hydrocarbons in subsurface earth formations traversed by a borehole, comprising:
(a) producing a first pore volume indication which is primarily dependent upon the hydrogen content of the fluid in the pore space of a formation;
(b) producing a function representative of a thermal neutron absorption characteristic of said formation; and
(c) combining the absorption characteristic function of said formation with the first pore volume indication and a predetermined absorption characteristic for the water component of the formation to produce a second pore volume indication such that the presence of hydrocarbons is indicated by differences between said produced first and second pore volume indications.

24. The method of claim 23 and further including the step of displaying said produced first and second pore volume indications in a comparable manner.

25. Apparatus for indicating the presence of hydrocarbons in subsurface earth formations traversed by a borehole, comprising:
(a) means for producing a first pore volume indication which is primarily dependent upon the hydrogen content of the fluid in the pore space of a formation;
(b) means for producing a function representative of a thermal neutron absorption characteristic of said formation; and
(c) means for combining the absorption characteristic function of said formation with the first pore volume indication and a predetermined absorption characteristic for the water component of the formation to produce a second pore volume indication such that the presence of hydrocarbons is indicated by differences between said produced first and second pore volume indications.

26. Apparatus for indicating the presence of hydrocarbons in subsurface earth formations traversed by a borehole, comprising:
(a) means for operating a neutron source for a predetermined time period;
(b) means for operating a plurality of detectors differently spaced from said source to produce neutron-dependent responses during predetermined times relative to the operation of said source;
(c) means for combining at least some of said responses to produce a first pore volume indication which is primarily dependent upon the hydrogen content of the fluid in the pore space of a formation adjacent to said detectors;
(d) means for combining at least some of said responses to produce a function representative of a thermal neutron absorption characteristic of said formation; and
(e) means for combining the absorption characteristic function of said formation with said produced first pore volume indication and a predetermined absorption characteristic for the water component of said formation to produce a second pore volume indication such that the presence of hydrocarbons is indicated by differences between said produced first and second pore volume indications.

* * * * *